Figure 23:
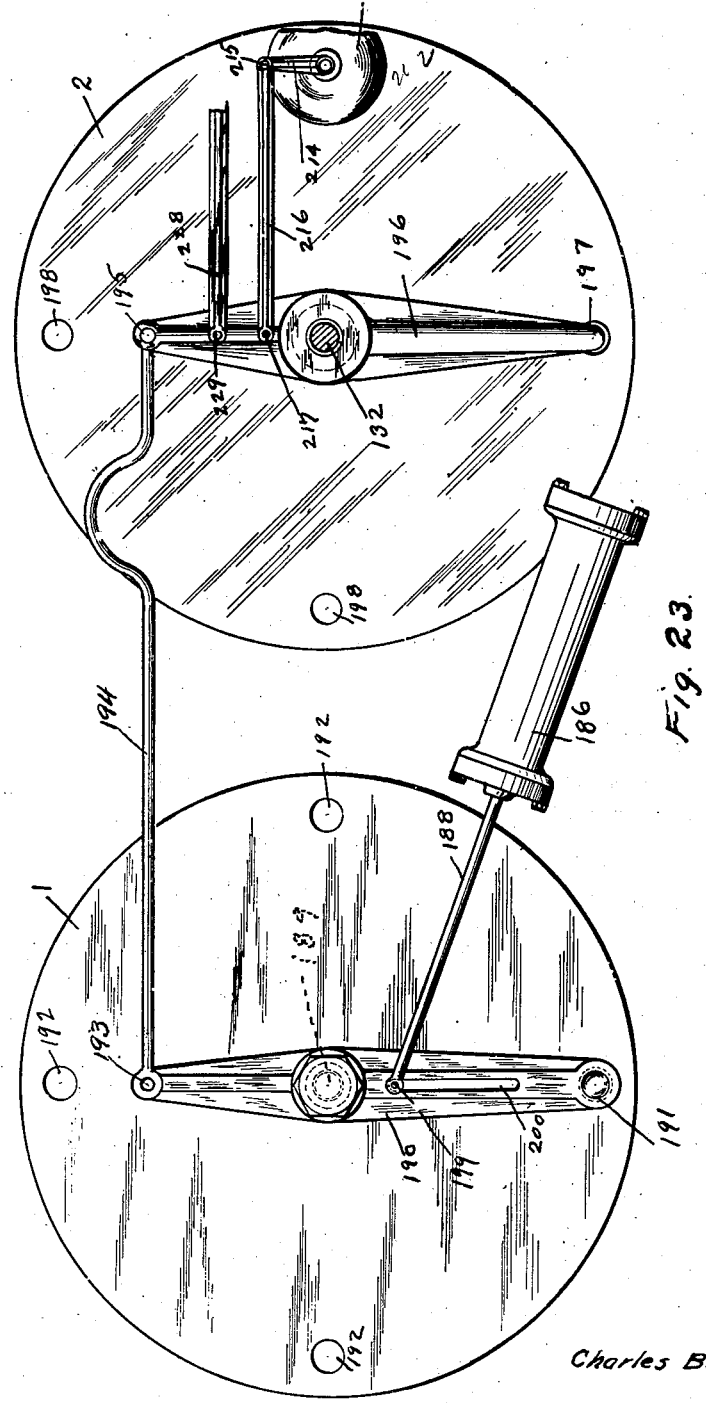

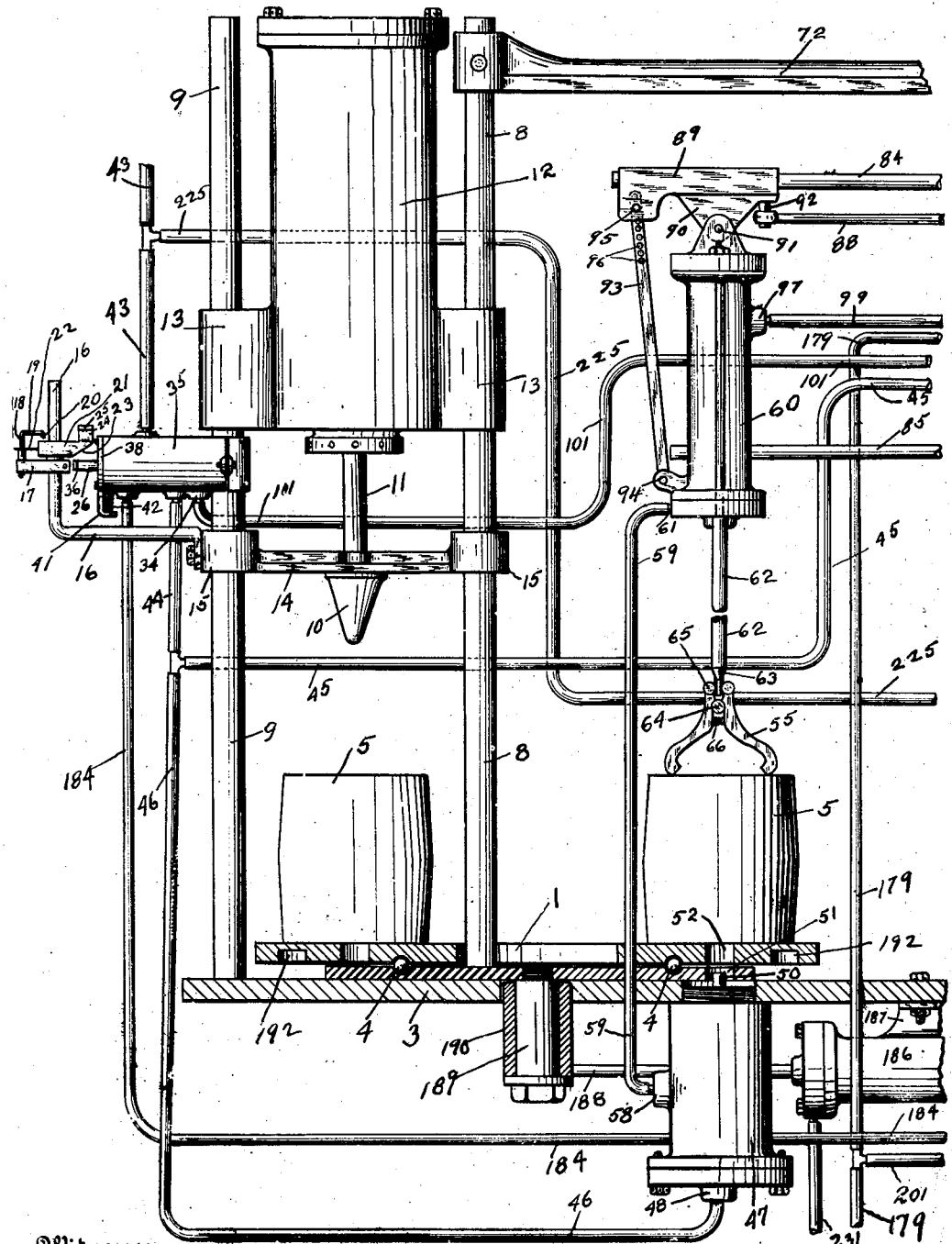

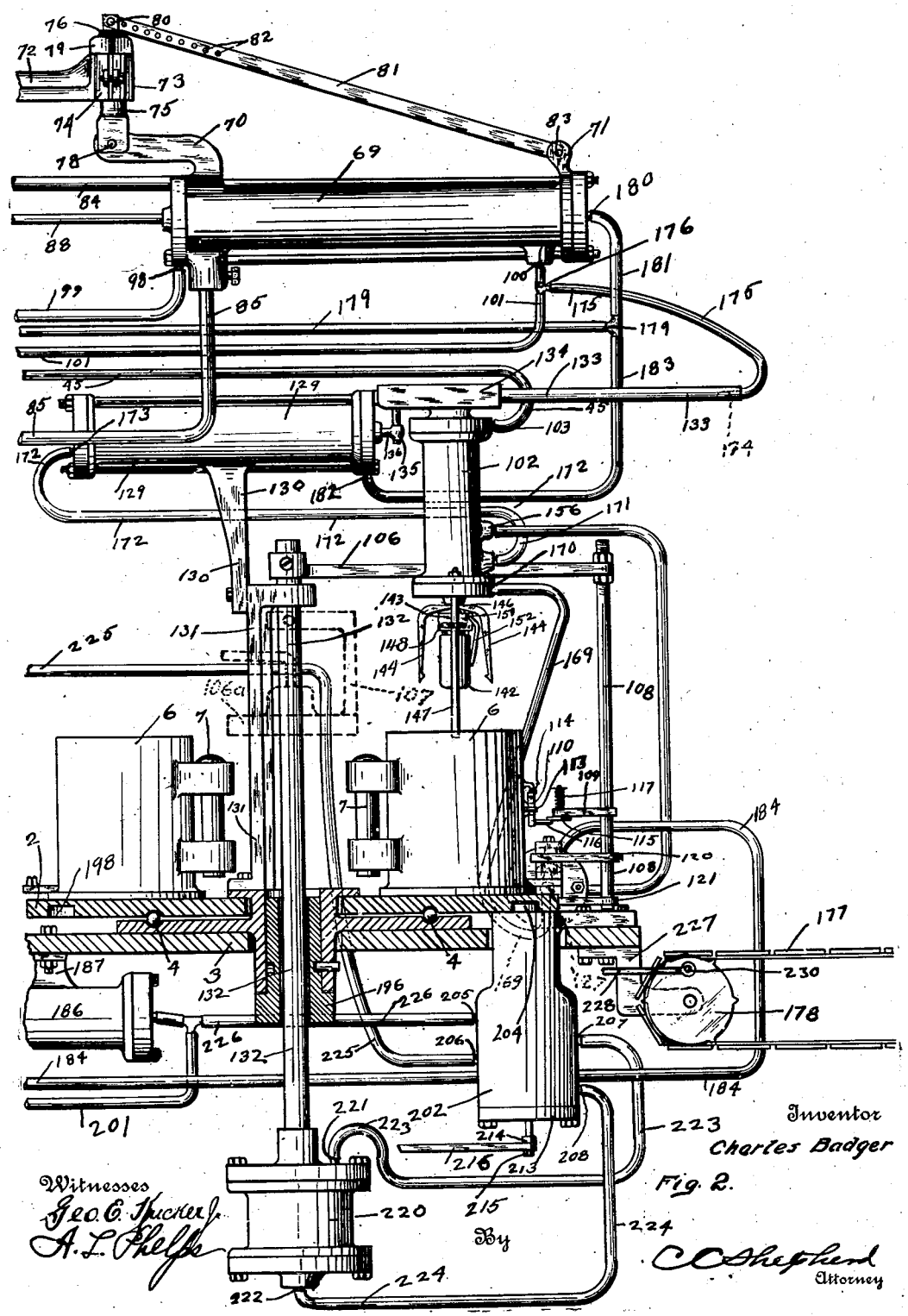

Feb. 10, 1931.  C. BADGER  1,792,267
GLASS MACHINE
Original Filed Oct. 7, 1915   8 Sheets-Sheet 3
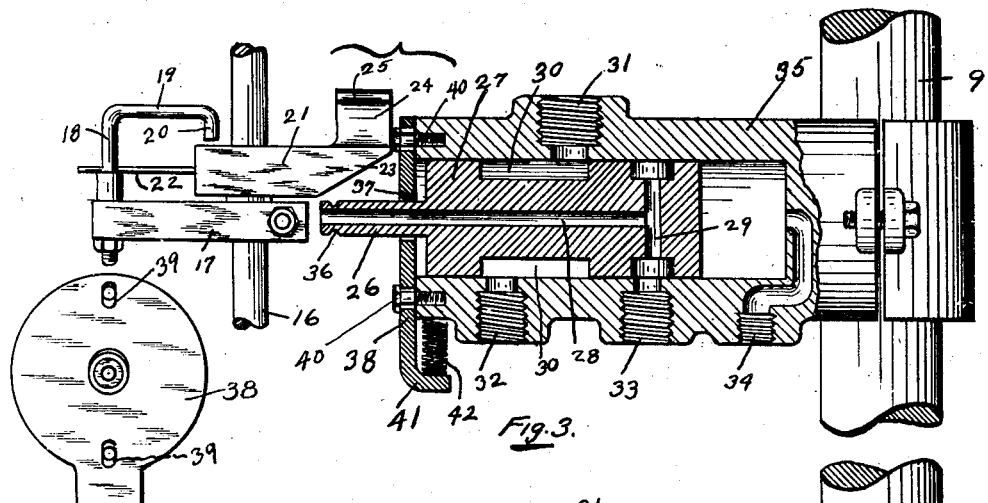
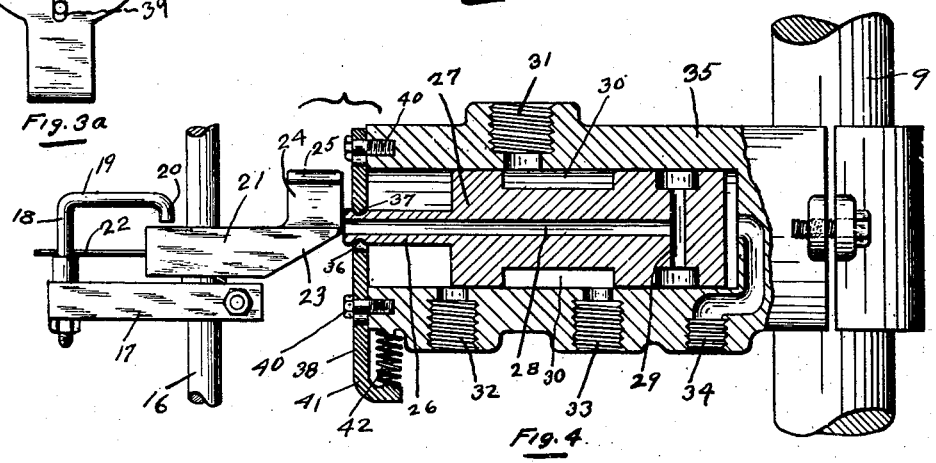
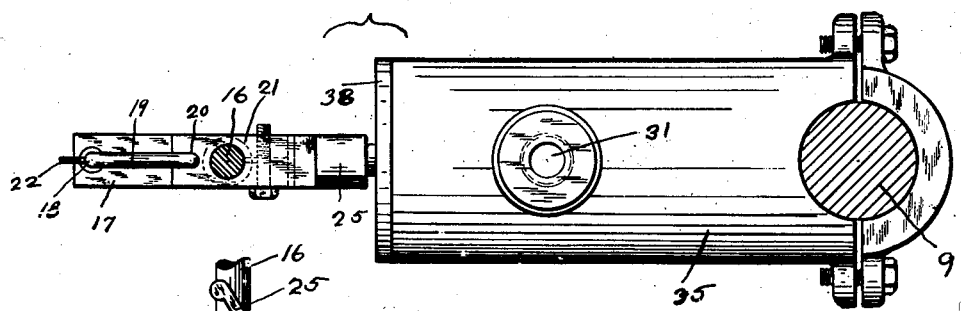
Inventor
Charles Badger.

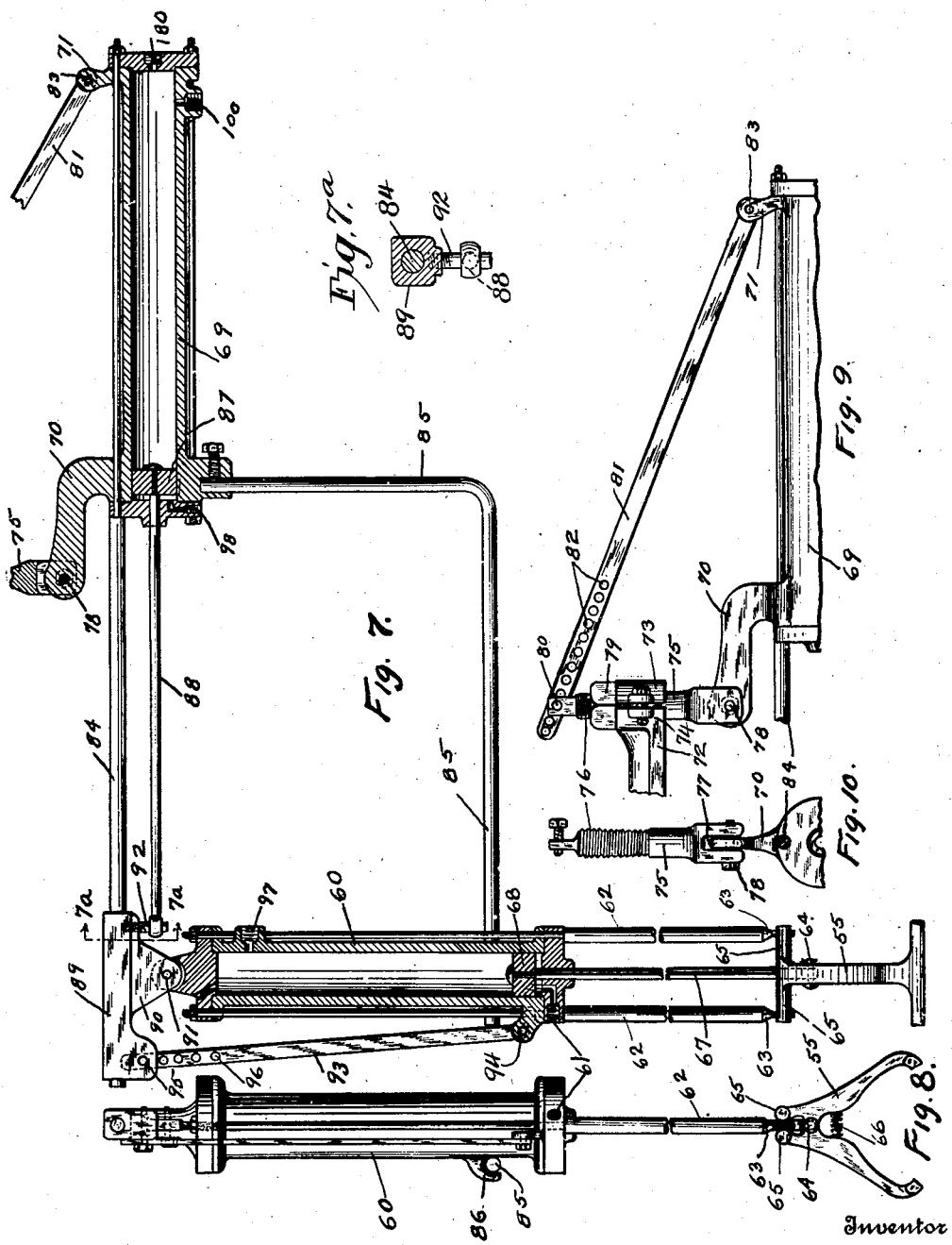

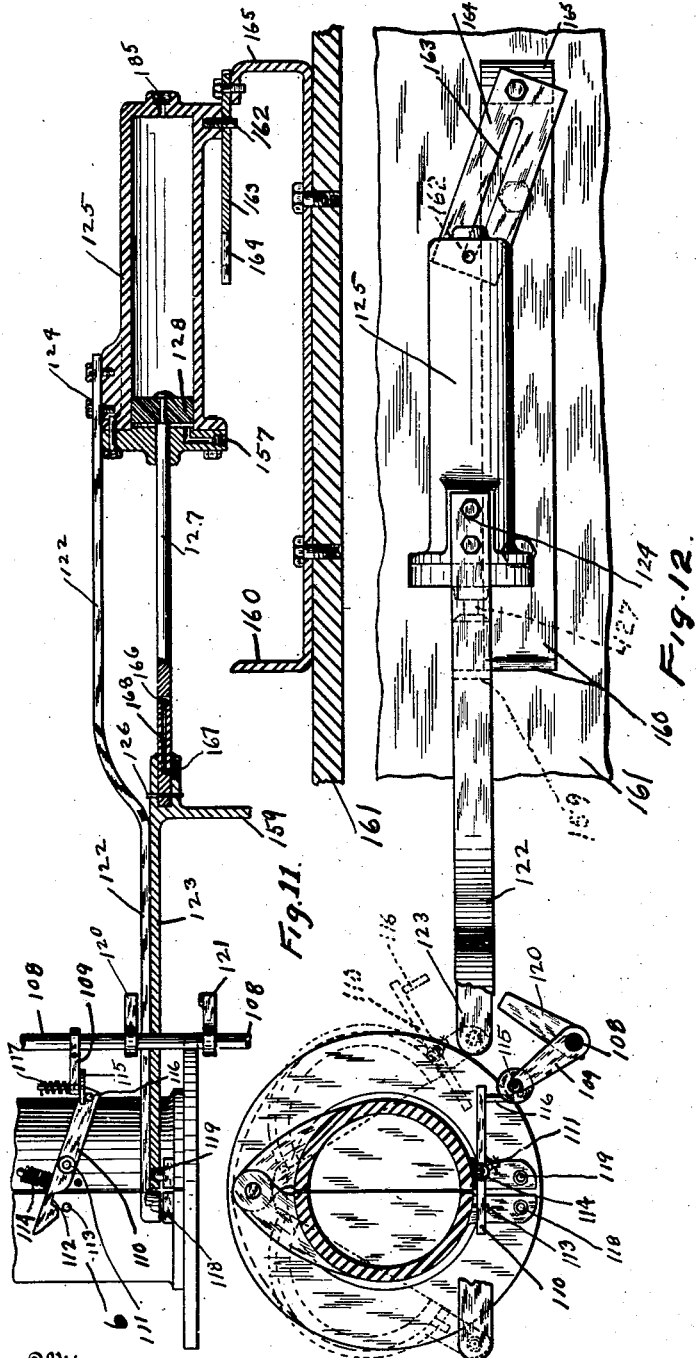

Feb. 10, 1931. C. BADGER 1,792,267
GLASS MACHINE
Original Filed Oct. 7, 1915 8 Sheets-Sheet 6
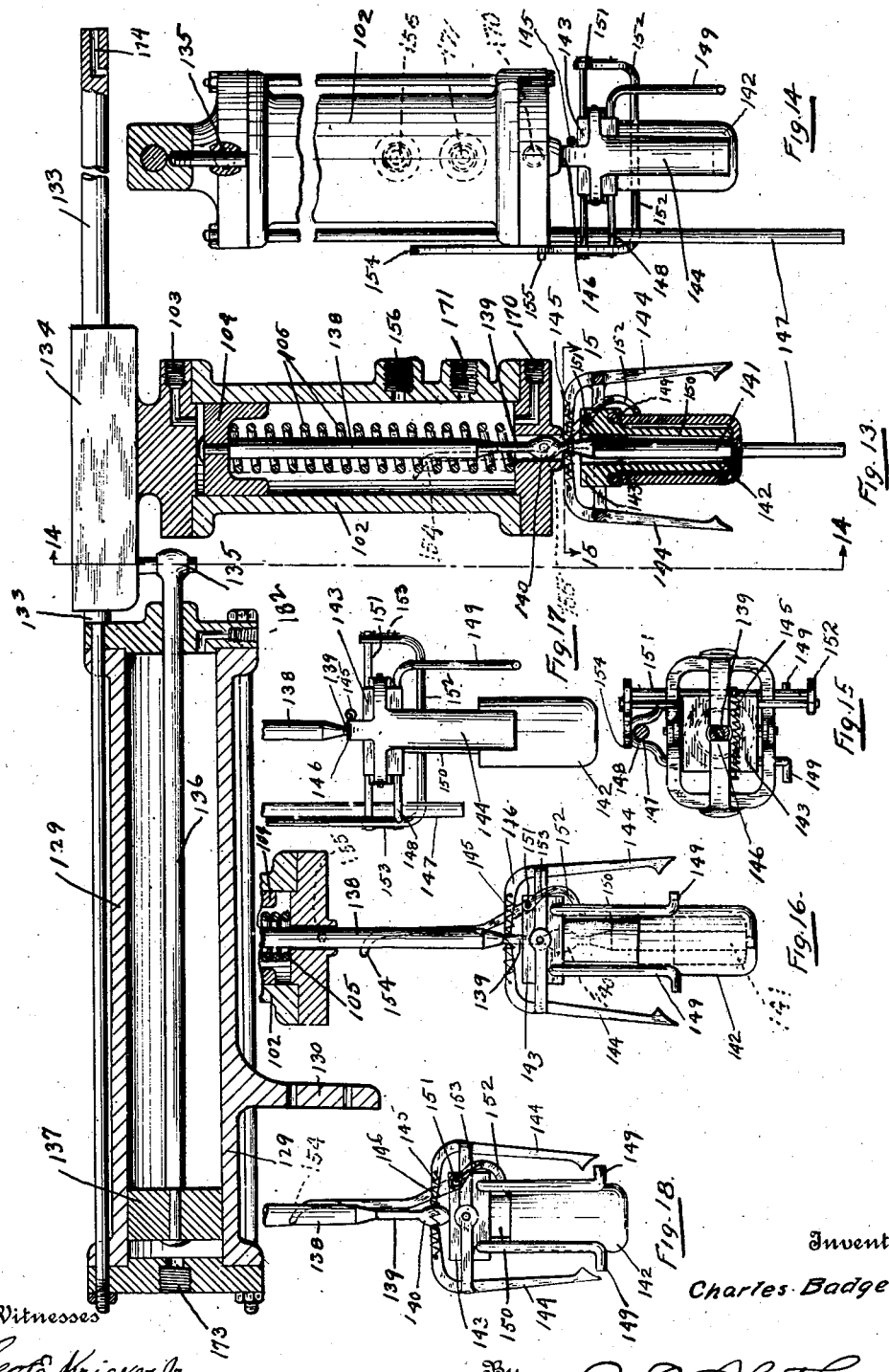
Inventor
Charles Badger.

Feb. 10, 1931.  C. BADGER  1,792,267
GLASS MACHINE
Original Filed Oct. 7, 1915   8 Sheets-Sheet 7
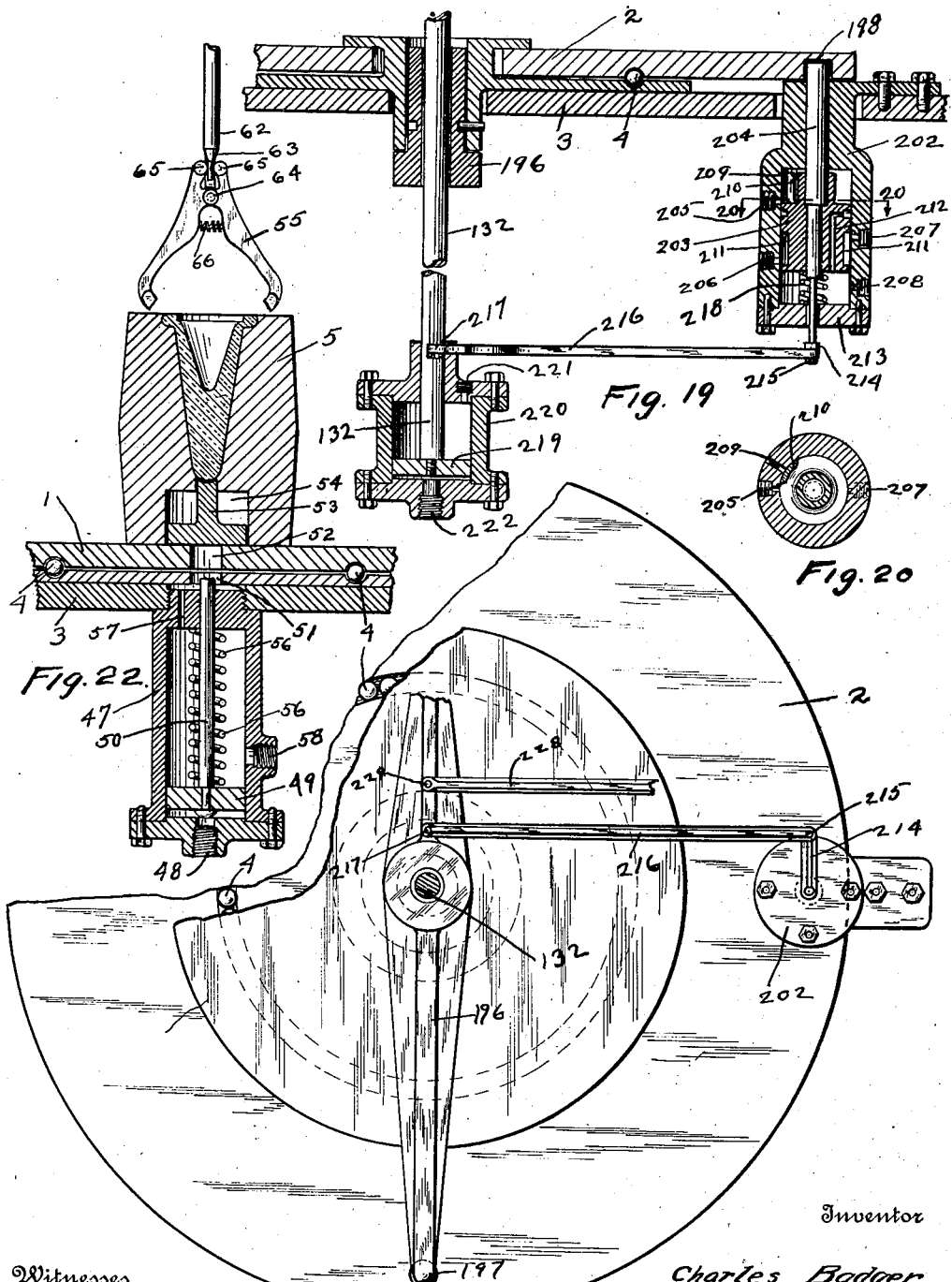

Feb. 10, 1931.　　　　C. BADGER　　　　1,792,267
GLASS MACHINE
Original Filed Oct. 7, 1915　　8 Sheets-Sheet 8

Witnesses
Geo. E. Kricker Jr.
A. L. Phelps

Inventor
Charles BADGER
By C. C. Shepherd
Attorney

Patented Feb. 10, 1931

1,792,267

UNITED STATES PATENT OFFICE

CHARLES BADGER, OF COLUMBUS, OHIO, ASSIGNOR, BY MESNE ASSIGNMENTS, TO LYNCH GLASS MACHINE COMPANY, OF ANDERSON, INDIANA, A CORPORATION OF INDIANA

GLASS MACHINE

Application filed October 7, 1915, Serial No. 54,697. Renewed June 21, 1929.

My invention relates to glass machines of the type in which it is necessary to perform a series of operations upon the ware before it is completed. I have shown my invention applied to bottle forming machines, but it is to be understood that certain features thereof and principles used therein may also be applied to pressed ware.

One of the principal aims of my invention is the production of glassware by a machine which is automatic throughout in the performance of a plurality of operations heretofore performed partly by hand before the ware is completed. Machines equipped with my improvement require only that the gather be placed in the molds in any desired manner, the remaining operations then taking place automatically.

One of the important features of my invention resides in the use of blank molds and blow molds, together with means for automatically transferring the formed blanks from one mold to the other. In making some kinds of ware it has been found desirable to use one piece or non-sectional molds in which to form the blanks, and I have, therefore, provided a structure for causing a relative movement of the blank out of the blank mold a distance sufficient to enable them to be gripped by means independent of the molds, but my invention is not to be restricted to the use of this type of molds. After the blanks have been gripped or disengaged from the blank molds, means come into play for automatically removing them from the blank mold position and transferring them to the blow molds.

In this embodiment of the invention, I have resorted to the use of two tables, one carrying the blank molds and the other the blow molds, and with these two tables, a structure for automatically causing a cooperative movement between the two so that when one of the molds on the blank table is presented in position to one end of the transfer means, the other end of this means will be in its correct relation with one of the blow molds to receive the transferred article.

Another object of my invention resides in the provision of a structure for automatically opening the sectional molds and then automatically removing the formed ware therefrom, hereinafter termed the "turn-out" unit. In this connection, it may be well to state that wherever sectional molds carry the formed ware and the molds are then opened, this ware will, in a great many instances, stick to one or the other of the sections thereof. I have, therefore, provided means for engaging the formed ware prior to the opening of the mold so that the same may be centered and be prevented from sticking to any of the sections. After this is accomplished, means are provided for automatically slightly elevating the ware, this latter feature being designed to operate in conjunction with automatic means for removing the ware from the molds. It is desirable to slightly elevate the same before its removal laterally to avoid scraping along the bottom of the mold and thus turning out an imperfect bottle.

Another object of my invention also resides in providing an automatic mold opener, this mold opener preferably coming into operation after the ware has been engaged as previously outlined.

Still a further object of my invention resides in providing means for automatically unlocking the sections of the sectional molds and before the operation of the mold opener.

Other objects of my invention will become more apparent after a further detailed description of the accompanying sheets of drawings, in which similar characters of reference designate corresponding parts, and in which:

Figure 1 is a side elevation shown somewhat diagrammatically of a portion of a glass machine embodying the principles of my invention, the remainder being shown on Sheet 2, Figure 2 is a completion of the machine shown in Figure 1, Figure 3 is a partial elevation and partial section of the main controlling valve and its operating mechanism used by me, Fig. 3a is an end view of the main controlling valve looking from the left.

Figure 4 is a view similar to Figure 3, but showing the operating mechanism moved to a position to alter the position of the valve, Figure 5 is a plan view of the structure shown in Figures 3 and 4, Figure 6 is a side elevation of the operating mechanism shown in Figures 3, 4 and 5 and looking toward the left, Figure 7 shows the transfer unit, in section, for transferring the blanks from the blank table to the blow table, Figure 7a is a section taken on line 7a—7a of Figure 7, Figure 8 is a side elevation of the structure shown to the left of Figure 7, Figure 9 is the completion of the upper portion of Figure 7 showing the manner in which the air cylinder at the right of the sheet is held supported, Figure 10 is a side view of the supporting screw shown in Figure 9, Figure 11 is a sectional view of the mold opener shown in connection with one of the molds, Figure 12 is a plan view of the structure shown in Figure 11, Figure 13 is a sectional view of the turn-out unit for transferring the formed ware from the blow table to the conveyor mechanism, Figure 14 is a section taken on line 14—14 of Figure 13 and looking in the direction of the arrows, Figure 15 is a section taken on line 15—15 of Figure 13 and looking in the direction of the arrows, Figure 16 shows the gripping mechanism of Figure 13 in an intermediate position between its lowermost and uppermost positions, Figure 17 is a side view looking toward the right of Figure 16, Figure 18 shows the gripping mechanism of Figure 13 in its lowermost or gripping position, Figure 19 is a view in central section of a portion of the blow table together with its operating valves, Figure 20 is a section taken on line 20—20 of Figure 19 and looking in the direction of the arrows, Figure 21 is a fragmentary bottom view of the completed structure shown in Figure 19, Figure 22 shows the mechanism for partially elevating the formed blank in connection with the blank mold and blank table, Figure 23 shows a bottom view of the blank and blow tables together with the mechanism for causing their simultaneous operation.

As previously stated, I have resorted to the use of a blank table 1 and a blow table 2, both mounted upon any suitable supporting structure 3 and being rotatable about their centers on anti-friction bearings 4. The table 1 carries blank molds 5, these molds being preferably of non-sectional form because of the low up-keep expense while the table 2 carries blow molds 6 each formed of hinged sections pivotally mounted together at 7. The press head for use in connection with displacing the central portion of the gather to form the completed blank, is mounted in any suitable location and carried upon upwardly extending standards 8 and 9. This press head comprises a die 10 rigidly supported upon an upstanding rod 11 operable within the air head 12. This air head is of conventional construction and is rigidly mounted upon the standards 8 and 9 by means of the pierced ears 13, while the lower end of the piston rod 11 carrying the die 10 is rigidly held in position by means of the cross bracket 14 also vertically slidable upon the standards 8 and 9 by means of its end bearing portions 15. This cross bracket 14 is provided with an overhanging bracket 16, the vertical arm of which carries the main valve operating mechanism shown in detail in Figs. 3 to 6, inclusive. This mechanism comprises an outwardly extending arm 17 adjustably carrying an upwardly extending finger 18 whose horizontal leg 19 is downturned as at 20 to cooperate with the arm 17 in preventing appreciable vertical movement of the cam member 21 on the rod 16. The cam member 21 carries a spring wire 22 which wire passes through an aperture in the leg 18 and thus normally maintains the position of the cam member 21 with respect to its supporting rod 16 as is shown in Figures 3, 4 and 5. It will be understood that this cam member is suitably bored to slide on the rod 16 and is further provided with a forward inclined face 23 and an upstanding portion 24 having an inclined face 25. These two faces 23 and 25 are adapted to coact with a central stem 26 of the main valve body 27 as will be presently described. Inasmuch as the cam member 21 is rigidly connected with the cross bracket 14 of the press head, downward movement of this press head also causes downward movement of the cam 21 and a consequent engagement of the face 23 with the stem 26 of the main valve 27. When the cam member is in its lowered position, the valve is again forced back to the position shown in Figure 1 and upward movement of the cross head carrying the cam causes engagement between the face 25 and the central stem, whereupon the cam body itself will be given a slight lateral oscillation to permit its passage, the spring 22 again causing its return to its correct position after it has passed the stem 26.

This stem 26 of the main valve 27, is centrally bored as at 28 through substantially the entire length of the valve body 27 where it terminates in a cross passage 29. The valve body 27 is also provided with an annular cut-out portion 30 which cut-out portion, together with the ends of a cross passage 29, are adapted to cooperate with ports 31, 32, 33 and 34 of the casing 35 housing the valve 27 as will be presently described. Also, the extreme forward end of the central stem 26 is provided with an annular groove 36, which is adapted to cooperate with the border portion 37 of an aperture formed in an anchor plate 38 carried upon the front of the casing 35. This anchor plate is provided with slots 39 through which the attaching screws 40 pass to hold it attached to the housing, while its lower end is provided with a downwardly and rearwardly extending tongue 41. A spring 42 is interposed between this tongue and the body of the casing to normally force the border portion 37 into engagement with the central stem 26 and consequently when the valve is moved to its innermost position, this border portion 37 seats itself in a portion of the annular groove 36 and thereby, because of the spring 42, resiliently guards against accidental operation of the valve before the time set for this operation.

The port 31 in the casing 35 serves to connect the main air line 43 with the rest of the system, the detailed construction and operation of which I will now describe. The movement of the press head is automatic and operates intermittently each time the blank mold is presented to a position directly beneath the die 10 in a manner common in machines of the type referred to. This automatic operation is common to numerous machines now in use and the mechanism for effecting this has not been shown, inasmuch as it forms no part of my invention. However, as was previously stated, movement of this press head causes a movement of the main valve within the casing 35 to a position such as is shown in Figure 4. The air in the main supply pipe 43 then enters the casing 35 through the port 31, circulates about the valve 27 through the annular space 30 and enters the pipe line 44 through the port 33 in the casing. This pipe line 44 branches out, as will be seen from Figure 1, into branches 45 and 46, the line 46 leading to the blank lifter 47, this lifter being shown in detail in Figure 22. At this point, a table stop is also provided for positively stopping the movement of both the blank and blow table, but the detailed description of this portion of the mechanism will be taken up later. The air line 46 enters the bottom of the air cylinder of the blank lifter 47 by means of a port 48 and, therefore, exerts its pressure upon a piston 49 to which is rigidly attached a piston rod 50 adapted, when the blank table is stopped in its correct position, to pass through aligning apertures 51 and 52 in the supporting table and blank table respectively to engage the lifting valve 53 located in the countersunk portion 54 of each blank mold. The upward movement of this lifting valve imparts a vertical movement to the formed blank within the blank mold and this movement is calculated to be a distance sufficient to permit of its being grabbed by lifting tongs 55 of the transfer unit.

These lifting tongs are in the position indicated in Figs. 1 and 22 each time a blank is moved out of the blank mold by means of the lifting valve. The air entering the lifter 47 through the air line 46 operates the piston 49 against the tension of a coiled spring 56 encircling the piston rod 50. Upward movement of the piston 49 expels whatever air may be above it through a relief port 57 in the upper portion of the lifter cylinder. After the piston 49 has traveled through a portion of its stroke, it uncovers a port 58 in the lifter cylinder which connects with an air line 59 leading to the bottom of and entering the vertical cylinder 60 of the transfer unit through the port 61, as is more clearly shown in Figs. 1, 7 and 8. This vertical cylinder 60 carries downwardly extending cam rods 62 having cam formations 63 at their lower ends, these cam formations being designed to cooperate with the lifting tongs 55. These tongs 55 are pivotally connected to each other intermediate their ends as is shown at 64, their upper ends carrying laterally projecting arms 65 and the tongs themselves being normally held forced apart by means of a small coiled spring 66. Further, these tongs are positively connected at their pivotal connection of the piston rod 67 carrying a piston 68 which moves up and down within the vertical air cylinder 60. As soon as air enters through the port 61 by way of the air line 59 from the lifter cylinder 47, the piston 68 rises and consequently carries the lifting tongs 55 with it. This upward movement forces the tongs toward each other by engagement of the lateral arms 65 with the cam formations 63 and inasmuch as the blank has been previously lifted a sufficient distance, these tongs will grip the blank and carry it upwardly.

The transfer unit itself is formed mainly of two air cylinders, the vertical cylinder 60, already described, and the horizontal air cylinder 69. This horizontal cylinder 69 is provided along its upper edge with two suitably formed ears 70 and 71, both these ears being pierced to form connections with their supporting structure. The vertical standard 8 forming a portion of the press head carries, adjacent its upper end, an outwardly extending bracket arm 72 the outer end of which is shaped to form a split bearing. The cap 73 of this split bearing is bolted to a complemental formation 74, the portions 73 and 74 being suitably shaped to embrace the bolt 75, (Figs. 2, 9 and 10) threaded at its upper end as at 76 and bifurcated at its lower end as at 77 to embrace the ear 70 of the air cylinder 69, the bolt 78 forming the connection between the bolt 75 and this air cylinder. The threads 76 on the bolt 75 permit of a vertical adjustment of the horizontal cylinder 69 and this cylinder is further steadied by means of the nut 79. The extreme upper end of the bolt 75 carries a pierced projection 80 to which is attached a link 81, this link being provided with a plurality of apertures 82 to adjust the angularity of the air cylinder 69 and being attached at its opposite end 83 to the integral ear 71 of the cylinder 69. It will thus be noted that the air cylinder 69 is positively supported in its correct position, this cylinder further carrying a rearwardly projecting rod 84 and a downwardly and rearwardly projecting rod 85 designed for cooperation with the vertical cylinder 60. Both these rods extend to a position adjacent the air cylinder 60, the rod 85 being embraced by an embracing lug 86 carried by the vertical cylinder and more clearly shown in Figure 8. This embracing lug 86 and the rod 85 serve to steady the cylinder 60 in its horizontal movement, as will be presently described, and this horizontal movement is effected by the piston 87 within the horizontal air cylinder 69 and its connecting rod 88. This connecting rod 88 is attached opposite its piston end to a slide member 89 slidably mounted on the rod 84, this slide member being the one to carry the vertical cylinder 60 by means of its downwardly projecting ear 90 and the connecting bolt 91. The connecting rod 88 is itself attached to the slide member 89 by the pin and eye connection shown generally at 92. The vertical cylinder 60 is held against oscillation by means of the link 93 attached to the lower end of this cylinder at 94 and adjustably connected to the rear extremity of the slide member 89 at 95 by means of any one of the apertures 96, the purpose of the latter being particularly to adjust the angularity of this cylinder 60.

Horizontal movement of the vertical air cylinder 60 will, therefore, be effected as soon as this piston 68 has traveled vertically a distance sufficient to uncover the port 97 in its upper end, this port being connected to a port 98 in the left hand end of the horizontal cylinder by means of the air line 99. After this port 97 has been uncovered by the vertical travel of the piston 68, the air will be given entrance to the horizontal cylinder 69 and the cylinder itself being held stationary by virtue of its mounting, the piston will travel toward the right and because of its connection with the vertical cylinder 60, this vertical cylinder will also be moved to the right. In the embodiment of my invention illustrated, the horizontal movement of the vertical cylinder is arranged so that at the end of its travel, the vertical cylinder will be in direct vertical alignment with the central portion of one of the blow molds 6 and, therefore, as soon as the air pressure is relieved, the lifting tongs together with the blank gripped by them, will descend by gravity and, as the lateral arms 65 of these lifting tongs pass over the camways 63, the spring 66 will force the tongs apart to permit disengagement of the blank.

The relieving of the air pressure above described may be accomplished by the piston 87 within the horizontal cylinder 69 of the transfer unit moving to the end of its stroke and uncovering the port 100 to which the air line 101 is connected. This air line 101 returns to the main operating valve casing 35 and enters the same by way of the port 34 to again move the valve body 27 to the position shown in Figure 1, from which it will be apparent that the main air supply is cut off from the pipe 44 and enters pipe 184 by way of the port 32. The amount of air already in the system may now exhaust freely by traversing the same path it entered and escaping to the atmosphere by means of the central bore 28.

However, simultaneously with the passage of the air through the pipe 46 to accomplish what has already been described, the pipe 45 branching off of the pipe 44 also carries air to the top of the turn-out cylinder 102 (Figs. 2 and 13 to 18 inclusive). This air enters the upper portion of this cylinder by way of the port 103 and forces its piston 104 downwardly against the tension of the coiled spring 105. It will be understood that this operation takes place about the same time that the blanks are being gripped from their position out of the blank molds. Also, as is customary in these machines, the blow head acts about the same time as the press head. In the normal operation of the machine, the blow head moves down to a position on top of the blow mold before the preceding one has received the formed blank from the transfer unit. This downward movement is communicated to the blow head 106a shown in dotted outline in Figure 2 by means of the connection 107, also shown in dotted outline, connected to the finger 106. Downward movement of this finger also causes downward movement of the rod 108 to which it is attached and this rod carries an arm 109 to which the mold unlatcher is attached. As has been previously stated, the blow molds are formed of sections pivotally hinged together at 7 and these sections are normally held closed by means of the latch arm 110 pivoted to one of the sections at 111, its end being formed with a cut-out space 112 to engage the pin 113 on the opposite section to securely hold the mold sections locked. This latch is normally held in locked position by means of the coiled spring 114 and is unlocked by the engagement of a foot 115 with a laterally projecting pin 116 on the latch bar itself. This unlatching operation may be slightly cushioned by the provision of a tension spring 117 attached to the unlatching foot. It will, therefore, be seen that downward movement of the blow head to a position of blowing causes the unlatching foot 115 to engage the latch 110 by means of its laterally projecting pin 116 whereby the two sections of the molds are unlatched.

This downward movement of the rod 108 caused by moving the blow head also moves the mold opening unit in Figs. 11 and 12, to an operative position in connection with one of the blow molds. The base portions of the respective sections forming the molds are provided with upstanding lugs 118 and 119, while the rod 108 is provided with two additional arms 120 and 121. These latter arms are so located with respect to the connecting rods 122 and 123 that the sockets formed in their left hand ends, as shown in Figs. 11 and 12, will seat themselves on top of the lugs 118 and 119 when the blow head moves down. The connecting rod 122 is rigidly connected at 124 to a cylinder 125 of the mold opening and closing unit, while the rod 123 is rigidly connected at 126 to the piston rod 127 of the piston 128 which operates within the cylinder 125. It will, therefore, be apparent that movement toward the right in Figure 11, of the rod 123 will cause a separation of the two sections of the mold after it has been unlatched by the operation just described. This movement is imparted to the pivoted mold sections as will be presently described.

It will, therefore, be seen that the press head, the blow head, the blank lifter 47, the mold unlatcher, the mechanism for definitely placing the mold opener and closer in position to open the molds, as is shown in Figs. 11 and 12, and the turn-out unit whose cylinder is shown at 102, act practically simultaneously.

The turn-out unit is shown in Figs. 2 and 13 to 18 inclusive, and comprises the vertical cylinder 102 and a horizontal cylinder 129, the latter being mounted by means of the formation 130 upon a standard 131 which also serves the purpose of supporting a central shaft 132 about which the blow table rotates. It will thus be noted that the horizontal cylinder 129 is mounted to be permanently stationary and this cylinder carries a guide rod 133 at its forward end. Upon this guide rod there slides a guide member 134 forming a portion of the vertical cylinder 102, there being a connection, as is shown at 135, between the slide member 134 and the piston rod 136 of the piston 137 within the horizontal cylinder 129. It will, therefore, be apparent that outward movement of the piston 137 will cause a similar movement of the vertical cylinder upon the guide rod 133.

As previously stated, air enters the upper portion of the vertical cylinder 102 through the port 103 from the air line 45 and forces the piston 104 down against the tension of the spring 105. The piston rod 138 of the piston 104 is reduced as is shown at 139 and this reduced portion is provided with an enlarged cam 140. This piston rod is extended beneath the cam portion 140 as is shown at 141 and rigidly carries a cup-shaped element 142 at its lower end. A slide block 143 is also loosely mounted upon the lower half of the piston rod 138, this slide block pivotally carrying two gripping elements 144 normally forced apart by a small spring 145. Each of the gripping elements 144 also carries an inwardly turned extremity 146 adapted for cooperation with the cam portion 140 of the piston rod, this cam portion forcing the gripping portions toward each other, while the spring 145 normally forces them apart. In order to prevent partial rotation of the slide block 143 about the piston rod, I have provided the bottom of the cylinder 102 with a downwardly extending rod 147 and the slide block itself with a wire loop as at 148 to securely embrace the guide rod 147 and then passing through the slide block and having its two extremities bent down as is shown at 149. This slide block is provided with a sleeve 150 extending downwardly to a position to be at all times within the cup shaped element 142, the purpose of which will be later described. Also, the slide block pivotally carries at 151 a finger 152, this finger being spring pressed by a spring 153 to normally force its lower end toward the piston rod, while its upper end is given a slightly rounded formation 154 for cooperation with a pin 155 carried by the lower end of the cylinder 102 as will be presently described.

The operation of this portion of the turn-out unit is as follows: Air enters the upper portion of the cylinder 102 and forces the piston 104 downwardly, which movement also carries the cup-shaped member 142 down with it. It is the purpose of this cup-shaped member to enter the open mouth portion of the blown ware, such as milk bottles, to prevent the ware from adhering to one section or the other of the molds when these sections are spread apart. Air enters this turn-out cylinder before entering the mold opener cylinder and consequently the molds will be in a closed position to accurately center the ware with respect to the turn-out unit, thereby permitting the ready entrance of the cup member 142. As is particularly clear by reference to Figure 13, the upper edge of this cup-shaped member normally supports the slide block and, therefore, downward movement of the piston rod also permits the slide block 143 to descend by gravity. It will be remembered that this slide block also carries the pivoted gripping elements 144 but inasmuch as the mold has not been opened, it is the purpose of the downwardly bent wire 149 to engage the upper surface of the mold and thereby hold the gripping elements slightly spaced therefrom until the mold shall have been opened. After the mold has been opened a sufficient distance to escape contact with the wires 149, the gripping elements will also descend slightly further and this descent is sufficient to bring the inwardly turned arms 146 into engagement with the cam portion 140 to force the gripping elements together to engage the blown ware. The descent of the slide block in the manner outlined also carries the pivoted finger 152 down with it until the lower end of this finger engages the upper edge of the cup element 142. Any upward movement, therefore, of the piston 104 will carry the cup-shaped element 142 with it as a rigid attachment and because of the position of engagement of the lower end of the finger 152 with the upper edge of this element, this upward movement will also be transmitted to the slide block 143 and inasmuch as this slide block carries the pivoted jaws which are now in a position of engagement with the ware because of the cam formation 140, this slide block, together with the ware, will also be given an upward movement. A complete detailed description of this operation will be given later.

The descent of the piston 104 to its lowermost position in its cylinder 102 uncovers the port 156 which is connected to the port 157 (Figs. 13 and 11 respectively) by means of the air line 158. Again referring to Figs. 11 and 12 entrance of the air through the port 157 causes a rearward movement of the mold opener piston 128 and this movement continues until the downwardly projecting arm 159 of the connecting rod 123 engages the upwardly extending arm 160 carried upon any suitable support 161. The amount of movement until the fingers 159 and 160 engage, is calculated to be about one-half of the travel of the piston 128 and reference to Figure 12 in particular, will disclose that the rear portion of the cylinder 125 carries a pin 162 which is slidably mounted in a slot 163 in the plate member 164 carried upon the opposite terminal 165 of the member bearing the arm 160. This cylinder is, therefore, movably mounted in its position and as soon as the movement of the piston 128 is resisted, the air pressure continues to exert its influence and the cylinder 125 will be caused to move toward the left by virtue of its pin and slot connection until the piston shall have reached its rearmost position against the rear wall of the cylinder. It will, therefore, be noted that the piston and cylinder are moved in opposite directions and, therefore, their respective connecting rods 123 and 122 engaging the lugs 119 and 118 on the molds, cause the sections of each mold to swing apart.

The piston rod 127 is also provided with two ports 166 and 167, these two being connected to each other by a central passageway 168. The port 167 is connected by an air line 169 to a port 170 in the lower portion of the turn-out cylinder 102 and when the piston rod shall have traveled a distance sufficient to bring the port 166 into the interior of the cylinder, the confined air therein will pass out through the ports 166 and 167 through the pipe 169 into the lower portion of the cylinder 102 which will cause a slight upward movement of the now lowered piston because of the assistance of the spring 105. It will be remembered that the same air pressure still exists on top of this piston 104 as is beneath it, but the additional pressure of the spring causes a slight upward movement until the port 171 is uncovered whereupon the air is again released to pass out through an air pipe 172 and enter the horizontal cylinder 129 through a port 173. The slight elevation given the piston 104 is to lift the ware out of contact with the base of the mold, as has been previously described, due to engagement of the pivoted finger 152 with the upper edge of the cup element 142, so that its subsequent horizontal movement caused by the entrance of the air through the port 173 and acting on the piston 137 to force it outwardly, will not cause a scratching on the bottom of the ware. This outward movement of the piston causes a horizontal movement of the vertical cylinder 102 since this cylinder is rigidly connected to the slide element 134 slidable on the rod 133.

The structure and operation of the transfer unit has already been described, but this description ended where the formed blank was transferred from the blank mold to the blow mold. This horizontal movement was caused by movement of the piston 87 in the horizontal cylinder 69 (Fig. 7). Movement of this piston 87 to the end of its stroke, uncovered the port 100 which connects to the air line 101 leading to the rear side of the main operating valve to change its position from that shown in Figure 4 to that shown in Figure 3. Since the transfer unit and the turn-out unit act practically simultaneously because of the air lines 45 and 46 branching from the air line 44, the formed blank and the blown ware will be moved horizontally at practically the same time. To insure that the main valve 27 within the casing 35 will not be actuated before the turn-out unit has completed its horizontal travel, I have provided the slide rod 133, Figs. 2 and 13, with the relief bore 174. This bore enters the end of the slide rod 133 and then is turned at right angles and this bore is connected by an air line 175 with the air line 101 coming from the horizontal cylinder 69 of the transfer unit as is clearly shown at 176. The purpose of this is to safeguard the operation of the main valve for, should the piston in the cylinder 69 reach the end of its stroke and uncover the port 100 before the complete horizontal movement of the piston 139 within the cylinder 128 of the turn-out unit, the air in the transfer system will not return to actuate the main valve because it is permitted to escape through the safety air line 175 and out through the port 174 in the slide rod 133 of the turn-out unit. However, as soon as the slide member 134 attached to the vertical cylinder 102 of the turn-out unit reaches the end of its stroke, it covers the outlet portion of the relief bore 174 and consequently stops the flow of air through the safety air line 175, thereby insuring its return through the air line 101 to operate the main valve from the position shown in Figure 4 to that shown in Figure 3. The shifting of the main valve cuts off the supply of air to the transfer and turn-out units, but permits whatever air may be in the systems to escape over the same path it entered and exhaust to the atmosphere by means of the central bore 28 in the valve body 27. The stoppage of the air supply permits the depositing of the formed blank and the blown ware by gravity. The operation of the transfer unit has already been described. The piston 68 carrying the tongs 55, Figs. 7 and 8, descends until the lateral projections 65 pass over the cam portions 63 of the cam rods 62 and thereby the tongs are released to deposit the formed blank into the blow mold.

The release of the blown article by the turn-out unit is accomplished as follows: It will be remembered that the piston 104 in the vertical cylinder 102 has been moved only a slight distance to elevate the ware from engagement with the bottom of the mold and until the port 171 has been uncovered. The stoppage of the air supply permits the pressure above the piston 104 to be relieved and the spring 105 then forces the piston up to the top of its stroke. However, it will be remembered that the top edge of the cup element 142 is in contact and engagement with the lower end of the pivoted finger 152. Therefore, any upward movement of the piston 104 also causes upward movement of the slide block 143 and, therefore, causes engagement of the cam portion 154 of the pivoted finger 152 with the pin 155 carried by the lower end of the vertical cylinder. This engagement forces the lower end of the finger 152 away from the cup 142 and disengages the slide block from the piston rod. Therefore, the piston rod is permitted a free upward movement independent of the slide block and this slide block may again descend by gravity. The relative movement between the piston rod and the slide block causes a spreading of the gripping elements 144 inasmuch as the cam portion 140 is moved out of engagement with the inwardly turned arms 146. This, then, will release whatever blown ware may be gripped by the gripping elements 144.

The position of the vertical cylinder 102 of the turn-out unit just preceding this release is directly over the conveyor structure such as is shown at 177, which mainly consists of an endless chain structure passing over suitable sprockets such as shown at 178, which sprockets are given an intermittent forward motion as will be presently described.

The formed blanks and the blown ware have now been deposited in their respective positions and this action was accomplished by the lowering of the lifting tongs 55 of the transfer unit and the elevation of the lifting tongs 144 of the turn-out unit. Their vertical cylinders are now free to be moved back to the position shown in Figs. 1 and 2 and this is accomplished by providing an air line 179 controlled independent of the main operating valve, the valve controlling mechanism for this air line being preferably the main controlling valve for the table rotating means and not being shown herein. For purposes of the present invention it is necessary to state only that air is admitted to line 179 after the vertical cylinders of the transfer and turn-out units have been moved to a position to deposit the blanks and blown ware. When this is done, air enters the port 180 (Fig. 7) of the horizontal cylinder of the transfer unit, by means of the air line 181 branching from the line 179 and into the horizontal cylinder 129 of the turn-out unit through a port 182 (Fig. 13) through a branch air line 183. This admission of air acts upon the respective pistons to carry the vertical cylinders to the positions shown in Figs. 1 and 2.

However, as the main valve body 27 within the casing 35 has again been moved to the position shown in Figure 3, air enters from the main air line 43, passes around the annular cut-out portion 30 and enters an air line 184 through the port 32. This air line leads to the mold opener cylinder and enters through a port 185 (Fig. 11) to again force the piston 128 to the position shown in this figure to close the mold. After it is closed, the blow head is elevated, thereby releasing the connecting rods 122 and 123 from the sections of the mold and the tables are again given a partial revolution.

The turning and simultaneous control of these tables may be seen by referring to Figs. 1, 2, 19, 20, 21, and 23. The supporting table 3 for the blank table 1 and blow table 2 carries on its under surface a cylinder 186 by means of the integral upstanding ears 187. Within this cylinder, there operates a piston which is attached to a piston rod 188 shown particularly in Figure 23. To the central stub shaft 189 of the blank table 1, there is rotatably attached a turning lever 190. This turning lever is attached to the central spindle 189 at a point intermediate its ends and is made of a sufficient length to be slightly resilient. The end 191 carries an upstanding pin adapted for cooperation with sockets 192 in the underside of the blank table, one side of this pin presenting a square corner in the direction of rotation of the table, while its opposite side is slightly tapered so that it will disengage itself from the sockets when given a return movement. The opposite end of this lever 190 is pivotally connected at 193 to a connecting link 194 whose other end is also pivotally connected at 195 to a lever arm 196 centrally pivoted to the shaft 132. The end 197 of this lever arm 196 is provided with a pin similarly formed to that described in connection with the arm 190 to engage sockets 198 in the underside of the blow table 2. The piston rod 188 is connected to the centrally pivoted arm 190 by a pin connection 199 operable in a slot 200 carried by this arm. When air is admitted by means of the air line 201 branching off of the line 179 to the cylinder 186, its piston is forced outwardly and by means of the pin and slot connection of its piston rod 188, the tables are each given a quarter revolution. However, before it is possible to give these tables this partial rotation, it is necessary that they be unlocked, this locking and unlocking structure being shown particularly in Figure 19. In this figure, there is shown a locking cylinder 202 whose piston 203 is provided with a piston rod 204 which projects out of the upper end of the cylinder and is adapted to enter one of the sockets 198 in the underside of the blow table. The cylinder itself is provided with ports 205, 206, 207, 208 and 209, the latter shown in Figure 20, while the piston itself carries an upstanding shoulder 210 and is provided around its periphery with a groove 211. The piston is also provided with a right angular relief bore as is shown at 212. The end of the piston rod opposite from that shown at 204 projects down through the cylinder head 213 and is attached to an arm 214, the latter shown particularly in Figure 23. This arm 214 pivotally connects at 215 to a connecting link 216, the latter being pivotally attached at 217 to the operating arm 196. The piston 203 is normally held in the position shown in Figure 19 by means of the coiled spring 218. The lower end of the blow head shaft 132 to which the arm 196 is attached, carries a piston 219 adapted to slide back and forth within the blow head cylinder 220, the latter being provided with ports 221 and 222. The body 207 of the locking cylinder is adapted to be connected by an air line 223 to the port 221 in the upper side of the blow head cylinder, while the port 208 of the locking cylinder is adapted to be connected by an air line 224 to a port 222 of the blow head cylinder.

Referring to Figs. 1 and 2, it will be noted that the air line 225 branches directly off of the main air supply line 43 and enters the locking cylinder through the port 206. This permits the flow of air about the groove 211, out through the port 207 into the air line 223 and into the upper end of the blow head cylinder 220 through a port 221. As long as this air is active, it maintains the blow head in its lowered position, but when it is desired to give the tables a partial revolution, air is admitted through the air line 179, 201 and into the operating cylinder 186 as has been previously described. However, an air line 226 branches off of the line 201 leading to the operating cylinder and enters the locking cylinder through the port 205. The entrance of this air forces the locking piston 203 down to withdraw its piston rod 204 out of engagement with the sockets 198 in the underside of the blow table. This frees the two tables and permits the movement of the piston within the cylinder 186 to rotate the tables. However, this rotation is also imparted to the locking piston 203 by means of the link connection 216 with the lever 196 and the piston 204. After the table has been slightly rotated, or rotated sufficiently so that the piston 204 cannot return to the socket 198 in the blow table from which it has been withdrawn, the shoulder 210 carried by the upper end of the locking piston covers the port 205 and thus shuts off the supply of air from the air line 226, but does not discontinue the rotation of the tables until the piston within the operating cylinder 186 reaches the end of its stroke. At this point, the spring 218 beneath the locking piston 203 forces the piston rod 204 into a newly presented socket 198 in the underside of the blow table 2. This upward movement of the locking piston is permitted by the escape of whatever air may be confined above it by means of the port 209 which was uncovered by the partial rotation of the valve and the consequent uncovering of this port and the closure of port 205 by the shoulder 210.

During the time that the locking piston 203 is down, the air entering by means of the main air line 206 passes into the space formed by the groove 211, but this groove has now been moved out of registration with the port 207 and into registration with the port 208. This permits the air to flow out of the port 208 into the air line 224 and into the lower portion of the blow head cylinder through the port 222. The pressure of this air forces the blow head shaft up and maintains it up until the valve 203 is again caused to move by means of the spring 218 to the position shown in Figure 19. The piston within the operating cylinder 186 and consequently the arms 100 and 196 will be returned to their normal positions by the admission of air to an additional air line 231 suitably controlled from any external source, it being understood that the control of the line 179 is such that the air operating the piston will be shut off as soon as the piston has reached the end of its stroke.

The sprockets 178 forming a portion of the conveyor 177 are supported from any convenient supporting structure by means of brackets 227 and this conveyor is given motion by means of a connecting link 228 pivotally connected at 229 to the lever 196, Figure 23, and at its opposite end as at 230, Figure 2, to one of the sprockets 178. The leverages between these two points of connection is such that when the arm 196 is moved through ninety degrees, the sprocket 178 will be moved through 180 degrees and, therefore, a forward and return movement of the arm 196 causes one complete revolution of the sprocket 178 to advance the conveyor a sufficient distance to receive the article next deposited.

The complete operation of my machine is as follows: The air lines 179 and 231 are controlled in any suitable manner by valves not shown in the drawings. When air is admitted through the line 179 is enters the horizontal cylinders 69 and 129 of the transfer and trun-out units respectively through branches 181 and 183 to act upon their pistons to return the vertical cylinders to the positions shown in Figs. 1 and 2. A portion of this air also branches out through the pipe 201 where it enters the operating cylinder 186 and again branches into the pipe 226 where it enters the unlocking cylinder 202. The entrance of the air into this cylinder 202 forces its piston 203 downwardly and consequently causes an unlocking action of the piston rod 204. This frees the blank and blow tables and permits them to rotate by means of the air pressure within the cylinder 186. The outward movement of the piston rod 188 of this cylinder is transformed into a rotary movement by means of its pin and slot connection 199 and 200 with the arm 190, rotation being also given the blow table by means of the link connection 194 with the arm 196. The stroke of the piston rod 188 is such that the tables are moved through an angle of ninety degrees. The rotation of the blow table imparts rotation to the valve 203 by means of the link connection 216 with the lower end of the piston rod 204. When the table has been given a slight turn, the movement transmitted to the operating valve is sufficient to move its shoulder 210 to a position of closure over the port 205 and this, therefore, shuts off the air from this portion of the system from the line 226. This release of the air pressure above the piston then permits the spring 218 to operate upon the piston rod 204 to automatically force it into the newly presented socket 198 in the underside of the blow table when said socket moves to its correct position. When this occurs, the supply of air is withheld from the line 179 by a suitably controlled valve (not shown) such, for example, as the valve for the table rotating mechanism and admitted through the line 231, this latter serving only to return the piston within the operating cylinder 186 to its initial position.

However, during all this operation, air from the main line 43 is admitted to the locking cylinder 202 by means of the line 225. Before the blow table is unlocked, this air enters the cylinder through the port 206, circulates about the groove 211 and has access to the upper side of the blow head cylinder by means of the air line 223. This, of course, keeps the blow head in its lowered position, but as soon as the locking piston 203 is forced down, the groove 211 comes into registration with the port 208 and the air from the line 225 is then sent through the line 224 to the underside of the blow head cylinder, thus elevating the blow head to permit the free rotation of the tables. As soon as the locking piston returns to the position shown in Figure 19, air is again admitted to the upper side of the blow head cylinder and moves the blow head down.

About this time, the control of the press head (which may be any of the well known types) is such that it descends to operate the main controlling valve shown in Figs. 3, 4, 5 and 6. Before the descent of the press head, the controlling valve is then in the position shown in Figure 3 and the air flowing through the pipe 43 has access to the pipe 184 by means of the ports 31 and 32 and the annular groove 30. This air line 184 enters the port 185 in the rear of the mold opener and closer cylinder 125, (Figs. 11 and 12), but inasmuch as the sections of the molds are already closed, no action takes place. The descent of the press head moves the member 21 down with it and its cam face 23 engages the end of the central stem 26 of the main valve 27 and forces it to the position shown in Figure 4. It will be understood that the subsequent return of the press head does not affect the position of the air valve because of the shape of the cam face 25 and the pivotal mounting of the element 21 normally held in position by the spring 22. Also, the portions 17 and 20 prevent up and down movement of the element 21 upon its shaft 16. When the main valve is moved to the position shown in Figure 4, air enters from the main air line 43 through the port 31, annular shoulder 30 and into the air line 44 through the port 33. At this point, the air divides through the lines 45 and 46, that portion passing through the line 46 entering the lower end of the lifter cylinder through the port 48 to force its piston 49 up against the action of the spring 56. This upward movement partially elevates the formed blank through the medium of the lifting valve 53 and the piston rod 50. However, upward movement of the valve 49 uncovers the port 58, which permits air to flow through the air line 59 into the bottom of the vertical cylinder of the transfer unit through the port 61. The piston 68 having dropped by gravity to the position shown in Figure 7, before the admission of the air, presents the tongs 55 directly above the opening of one of the blank molds and the partially elevated blank, is, therefore, in the position to be grasped. As the air enters this vertical cylinder, the piston is moved upwardly and it carries the lifting tongs 55 with it, the cam surfaces 63 on the cam rod 62 serving to force the lower ends of these tongs toward each other to grip the blank and carry it upwardly. When this piston 68 has reached nearly the top of its stroke, it uncovers the port 97 and then admits air to the air line 99, which leads into the horizontal cylinder of the transfer unit 69 through the port 98. The piston rod 88 of the piston 87 of this cylinder being rigidly attached at 92 to the slide element 89 carrying the vertical cylinder, causes horizontal movement of the piston 87 as well as everything carried by the vertical cylinder and this travel is calculated to be such that the formed blank will be held in a position of direct alignment over one of the blow molds.

In the meantime, the air which passed out through the air line 45 carries on a similar action in the turn-out unit, this air entering the upper portion of the vertical cylinder of the turn-out unit through the port 103 forcing its piston 104 downwardly against the tension of the spring 105. In the meantime, after the operation of the table stop, air is again turned into the upper portion of the blow head cylinder to force the blow head down into engagement with the top of one of the molds. The downward movement of this blow head also caused downward movement of the finger 106 and the rod 108, this rod carrying the unlatching foot 109 and the fingers 120 and 121 which control the position of the mold opener. This down movement causes an unlatching of the latch 110 of the molds and causes the connecting rods 122, and 123 forming a portion of the mold opener to engage themselves with the lugs 118 and 119 carried by the base of the molds. The mold not having been opened, up to this time, the wires 149 will engage its upper surface and arrest any downward movement of the slide block 143. The piston itself, however, is free to move and the cup-shaped portion 142 will, therefore, enter the open mouth of the blown ware and accurately center and steady it so that it will not stick to one side or the other of the sections of the mold when this mold is opened or be jarred out of its central position relative thereto. The downward movement of the piston 104 uncovers the port 156 and permits the air to enter the port 157 of the mold opener cylinder 125 through the air pipe 158. The entrance of this air forces the piston into the cylinder until the projection 159 engages the projection 160. The distance between these two projections is calculated to be about half the length of the cylinder and, because of the slidable mounting of the cylinder by means of its pin 162 and slot 163, the cylinder itself moves forward until the piston 128 engages its rear wall. This forward movement moves the connecting rod 122 forward and opens the other section of the mold, whereby the blown ware is free to be removed. The opening of the molds now permits the wires 149 to drop downward and, therefore, also the slide block 143. Because of the particular location of the lower end of the finger 152 with respect to the upper edge of the cup 142, the limit of this movement is such that the cam portion 140 lies between the ends of the arms 146 of the gripping tongs, thereby forcing them toward each other to grip the blown ware.

About this time, the mold opener piston has reached the end of its stroke and the port 166 in the piston rod itself enters the interior of the cylinder and then the air passes out through the port 167 into the air line 169 and enters the lower portion of the vertical cylinder 102 of the turn-out unit through the port 170. The air pressure here is the same above and below the piston, but because of the assistance of the spring 105, this piston is moved upwardly until it uncovers the port 171 which permits the escape of the air below the piston and this air then passes through the pipe 172 into the rear of the horizontal cylinder of the turn-out unit through the port 173 and causes a horizontal movement of everything controlled by the piston rod 136. This slight upward movement of the piston 138 in the vertical cylinder is desirable to slightly elevate the ware from the base of the mold so that the subsequent horizontal movement will not scratch the same. The cam 140 and the tongs are maintained in the same relative position because the lower end of the finger 152 rides upon the upper edge of the cup 142. This upward movement, however, is just sufficient to bring the upper cam surface 154 of the finger opposite the laterally projecting pin 155 so that any subsequent movement will release the tongs.

The vertical cylinder of the transfer unit having been already described as being at the opposite end of its horizontal movement and also the vertical cylinder of the turn-out unit, means now come into play for depositing both the formed blank and the blown ware. This is effected by shifting the position of the main operating valve from the position shown in Figure 4 to that shown in Figure 3, to cut off the flow of air. In order that this air may not be shut off before the turn out has operated, I have provided the safety air line 175 forming a portion of the return pipe 101 from the cylinder 49 of the transfer. The piston within this cylinder 69 uncovers the port 100 and in order that the air may not flow through the return pipe 101 to operate upon the rear side of the main valve body 27 through the port 34, this air exhausts through the safety line 175 meeting into the end of the slide rod 133. As soon as the vertical cylinder is moved out to cover the outlet of the port in the end of this slide rod, the air must return through the line 101 and consequently the main valve will be shifted.

The shutting off of this air permits the air to exhaust over the same path that it entered and, therefore, the tongs of the transfer unit will drop by gravity while the spring 105 will force the turn-out piston 104 up to remove the cam 140 out of engagement with the ends of the tongs. In this connection, the cup 142 is also withdrawn by the upward movement of the piston in connection with the release effected between the finger 152 carried by the slide block engaging the pin 155. The two extreme positions are shown in Figs. 13 and 18. The formed blank is transferred to the blow mold and the blown ware is then deposited upon the conveyor 177 and the subsequent partial rotation of the table will cause a forward movement of this conveyor to make room for the next deposited article.

What I claim, is:

1. In a glass bottle forming machine, a mold table, parison forming molds on said table, automatically operable means for moving said table to bring said molds successively to a plurality of operating stations including a parison forming station and a transfer station, means for partially elevating the glass parisons in the parison mold while maintaining the major portion thereof within and centered by the mold, and pneumatically operated means operable when the mold has reached the transfer station and operating as a result of the operation of said first named means, and in predetermined timed relation therewith for continuing the elevation of said article to remove it entirely from said mold.

2. In a glass machine, a mold table, molds on said table, pneumatically operated means for partially elevating the glass articles while in the mold, and additional pneumatically operated means actuated by the air which operates said first named pneumatic means and controlled by and after said first named pneumatic means has been operated for continuing the elevation of said article to remove it from said mold.

3. In a glass machine, a mold table, molds on said table, pneumatically operated means for partially elevating the glass articles while in the mold, and additional pneumatically operated means actuated by the air which operates said first named pneumatic means and controlled by and after said first named pneumatic means has been operated for continuing the elevation of said article to remove it from said mold and transfer it to a position remote therefrom.

4. In a glass machine, a mold table, molds on said table, pneumatically operated article transfer means adapted to be moved to a position over said molds, additional pneumatically operated means for partially elevating the glass articles while in the mold to a position to be engaged by said transfer means, and means whereby said transfer means is operated to grasp the partially elevated articles and remove them to a position remote therefrom by the same air which operates said second named means.

5. In a glass machine, sectional molds adapted to form hollow glass articles, means for opening said molds, and an article removing mechanism comprising means operable before the molds are opened to enter the interior of the article to prevent its sticking to either section of the molds when the molds are opened, and means effective after the article is held centered and the molds are opened for gripping the article while engaged by the second mentioned means and thereafter lifting the article and removing it from the molds.

6. In a glass machine, sectional molds adapted to form hollow glass articles, means for opening said molds, and take out mechanism comprising steadying means operating before the molds are opened to engage the article to prevent it sticking to either section of the molds when the molds are opened and means operating after the molds are opened to grip the article while engaged by said steadying means, and remove it from the mold.

7. In a glass machine, sectional molds adapted to form hollow glass articles, means for opening said molds, steadying means and article gripping means, means for simultaneously actuating said steadying and gripping means to cause said steadying means to engage the mouth end of the article before the molds are opened and to positon said gripping means ready to grip said articles, and means operable after the molds are opened to cause said gripping means to grip the article and remove it from the mold.

8. In a glass machine, sectional molds for forming ware, means for opening said molds, and a single unit common to all molds embodying means to engage the ware before the molds are opened to hold it centered and also embodying means for gripping and removing the ware after the molds are opened.

9. In a glass machine, sectional molds adapted to form hollow glass articles, means for opening said molds, steadying means and article gripping means, means for lowering said steadying and gripping means into cooperative engaging position with reference to the mouth end of the article to cause the steadying means to engage the article before the molds are opened and means operable after the molds are opened for lifting said steadying and gripping means to grip and raise said article and remove it from the mold.

10. In a glass machine, a movable table, molds thereon adapted to hold the glass articles, means for moving said table, a vertically movable fluid pressure operated piston below said table, means for operating said piston by compressed air, gripping tongs normally in a position of close proximity over one of said molds when the table is stationary, an air cylinder and piston for giving a vertical movement to said tongs, connections for controlling the vertical movement of the tongs in timed relation to the movement of said first named piston to permit vertical movement of said tongs to grip and carry the glass article immediately upon operation of said piston, a second air cylinder and piston for giving horizontal movement to said tongs, and an air line between the two named cylinders so connected to cause horizontal movement of the first named cylinder, piston and tongs away from the mold upon the completion of the vertical movement of said tongs.

11. In a glass machine, a mold table, sectional molds on said table adapted to hold the glass articles, a centering tool adapted to center the glass articles before the molds open, gripping tongs adapted to grip the glass articles after they are held by said centering tool, an air cylinder, a piston and piston rod, said rod being connected to said centering tool, said gripping tongs being slidably carried on said rod, and a cam formation on said rod adapted to actuate said tongs.

12. In a glass machine a mold table, sectional molds thereon, means for unlocking said molds, an air cylinder and piston, connecting means leading to said molds operable to open the same when compressed air is turned into said cylinder, and means for operatively connecting and disconnecting said connecting means with the sections of the molds while they are in stationary position.

13. In a glass machine, sectional mold adapted to form hollow glass articles, means for opening said molds, means effective after the molds are opened to grip and laterally move the articles from the mold, and means cooperating with the gripping means and movable therewith for engaging and centering the articles as the molds are opened.

14. In a glass machine, a mold table, sectional molds thereon, an air cylinder and piston, a connecting rod carried by the cylinder, a connecting rod carried by the piston, means for attaching both rods to said molds, one to each section, and means for limiting the movement of each rod, to half the length of the cylinder when an air pressure is admitted between the cylinder and piston.

15. In a glass machine, a mold table, sectional molds thereon, an air cylinder and piston, a connecting rod carried by the cylinder, a connecting rod carried by the piston, means for attaching both rods to said molds one to each section, a stop for limiting the movement of the piston to half the length of the cylinder when an air pressure is admitted between the cylinder and piston, and means for mounting said cylinder in a manner to make it move toward the piston the remainder of its length under the same air pressure.

16. In a glass machine, movable mold supporting tables carrying blank molds and blow molds, respectively, means for securing said tables against rotation, a transfer device having gripping members operated to overlie said blank molds upon resting movement of said tables, means for partially raising the partly finished ware from a blank mold into cooperative grasping relation with said gripping members, and fluid pressure operated means for operating said gripping members to grasp said partially raised ware for lifting it clear of the mold and moving it laterally to a position in alinement with a blow mold, said table securing means and means for raising, grasping and moving said ware operating successively.

17. In a glass machine, an intermittently movable mold supporting table, blank molds positioned thereon, openings through said table in alinement with said mold positions, means disposed beneath said table and adapted to pass into successive openings as the table completes each movement to raise the blank, and means for grasping the raised blank to lift it and move it laterally, said raising and grasping means being operated by air pressure, and means for preventing operations of said grasping means until said raising means has operated.

18. In a glass machine, a mold table, molds on said table, pneumatically operated article transfer means having grasping jaws adapted to be moved to a position over said molds, additional pneumatically operated means for partially elevating the glass article while in the mold to a position between said jaws to be engaged thereby, and means whereby said transfer means is operated to grasp the mouth finish of the partially elevated article, lift it from the mold and remove it to a position remote therefrom.

19. Glass blowing apparatus comprising a pair of mold sections movable to open position, bottle top engaging means for retaining bottle ware from shifting as the mold sections open therefrom, and bottle neck gripping members normally associated with the engaging means and movable therewith and coacting with the ware adjacent the engaging means for removing the ware from the open mold.

20. A take-off device for shifting formed ware from an apparatus, including a first ware steadying engaging member, ware lifting means, and a carrier for shifting the member, means and ware.

21. In a glass machine, the combination of spaced parison forming and bottle finishing molds, a transfer device normally positioned in axial alignment with parison mold for engaging the neck end of the parison, lifting and laterally transferring it from the parison mold to the finishing mold, and lowering it therein, pneumatically operated means for effecting relative movement between said parison and parison mold and means operating as a result of and following the operation of said last named means for effecting movement of said transfer device.

22. In a glass machine, the combination of spaced parison forming and bottle finishing molds, means for disengaging the parison from the parison mold, a moving transfer device for transferring the parison from the parison mold to the finishing mold, while supporting it from the neck end, means operative as a result of the operation of said first named means for effecting movement of said transfer device to effect a lateral movement of the parison from the parison mold to the finishing mold.

23. In a glass blowing machine, the combination with a revoluble blow table, and a blow mold movable with the table, of means for automatically opening the blow mold when brought to a predetermined position, a guide fixedly mounted above the mold at said position, a member slidable on the guide, article gripping devices and a ware steadying member carried by said member, pneumatically operated means for successively lowering the gripping devices so that the steadying member engages the article, shifting said devices into engagement with the steadied article, and raising the article, pressure operated means at one end of the guide for shifting the slidable member with the elevated article, and means operated by said slidable member on reaching the other end of the guide for reversing the pressure to lower the gripping devices, release them from the engaged article, and return the slidable member to its initial position.

24. In a glassware forming machine, an intermittently movable blank mold carrier having blank molds thereon, an intermittently movable blow mold carrier having blow molds thereon, means for moving said carriers, means for partially elevating the initially formed glass blank in the blank mold while maintaining the major portion thereof within and centered by the mold, and means for automatically gripping the completely formed glass blank lifting it from the blank mold, moving it to the blow mold, and depositing it therein, said means being operable following and as a result of the operation of said elevating means and during periods of rest of said carriers.

25. In a glass machine, moving tables adapted to move in unison, molds to shape the articles, means for moving said tables, articles engaging devices normally in a position of close proximity directly over a mold upon one of said tables and movable to a position directly over a mold upon the other of said tables, means for partially raising the parison in one of the molds when the article engaging devices are directly over that mold, a cylinder and piston for giving vertical movement to said article engaging devices, means to operate said cylinder and piston following the partial lifting of the parison in the mold to cause said engaging devices to grip and lift the parison free from the mold, a second cylinder and piston for giving horizontal movement to said article engaging devices, and a fluid duct between said two cylinders to cause horizontal movement of the second named cylinder and piston and article engaging devices after the completion of sufficient vertical movement of said device.

26. In a glass machine, moving tables adapted to move in unison, molds to shape the articles, means for moving said tables, fluid pressure operated cylinder and piston mechanism below the table and operable upon the concluding movements of said tables, article engaging devices normally in a position of close proximity directly over a mold upon one of said tables and movable to a position directly over a mold upon the other of said tables when the latter is stationary, fluid pressure operated means for causing said devices to engage the article while in the mold, lift it, and move it laterally into alinement with another mold, and means for operating said fluid pressure means in synchronism with and as a result of the operation of said first named fluid pressure operated mechanism.

27. In a glass machine, moving tables adapted to move in unison, sets of molds to shape the articles, means for moving said tables and arresting movement thereof including a table detent, means for operating said detent by fluid pressure to hold said tables stationary, movable bottoms in one set of molds to partially lift the articles therein while maintaining the major portion thereof within and centered by the molds, article engaging devices normally in a position of close proximity directly over a mold upon one of said tables and movable to a position directly over a mold upon the other of said tables when the latter is stationary, means for actuating said movable bottoms of one of said molds when the article engaging device is directly over and in cooperating position with said mold.

28. In a glass machine, movable parison forming and bottle blowing molds, carriers for said molds adapted to move said parison molds successively to parison forming and transferring positions and bottle blowing molds to transferring, bottle blowing and take out positions, means for intermittently moving said carriers in unison, parison forming mechanism cooperating with said parison forming station, transfer mechanism at said transfer station adapted to grip and move the completely formed parison bodily from the parison mold to the blowing mold, said transfer mechanism adapted to effect lateral movement and parison lifting movement during a single period of rest of said carriers, means operating as a result of the movement of the parison forming mechanism for preventing said movement of the parison transfer mechanism except when the parison forming mechanism is in operation.

29. In a glass machine, movable parison forming and bottle blowing molds, carriers for said molds adapted to move said parison molds successively to parison forming and transferring positions and bottle blowing molds to transferring, bottle blowing and take out positions, means for intermittently moving said carriers in unison, parison forming mechanism cooperating with said parison forming molds at said parison forming station, fluid pressure operated transfer mechanism at said transfer station adapted to grip and move the completely formed parison bodily from the parison mold to the blowing mold, said transfer mechanism adapted to effect lateral movement and parison lifting movement during a single period of rest of said carriers, and a valve operable by the parison forming mechanism for preventing said movements of the transfer mechanism except when the parison forming mechanism is in operation.

30. In a glass forming machine, parison forming molds and bottle blowing molds, spaced movable supports for said molds, means for moving said supports to bring said molds to and from a common transferring position, transferring mechanism comprising article gripping tongs adapted to overlie said parison forming mold as said mold reaches the transferring position, fluid pressure operated means for partially elevating said parison in the parison molds at the transferring position to present the neck ends of the parisons above the molds and in cooperative position within said gripping tongs while maintaining the major portion of said parison within and centered by said molds, means operable following the partial lifting of the parisons for actuating said gripping tongs to grip the parison and lift it clear of the parison mold, and further means operative when said parison has been lifted clear of the parison mold for moving it laterally to a position over a blowing mold.

31. In a glass forming machine, parison forming molds and bottle blowing molds, spaced movable supports for said molds, means for moving said supports to bring said molds to and from a common transferring position, transferring mechanism comprising article gripping tongs adapted to move vertically and laterally and to overlie said parison mold in lowered position when said parison mold reaches the transferring position, fluid pressure operated means for partially elevating said parison in the parison molds at the transferring position to present the neck ends of the parisons above the molds and in cooperative position within said gripping tongs while maintaining the major portion of said parisons within and centered by said molds, means operable following the partial lifting of the parisons for actuating said gripping tongs to grip the parison and lift it clear of the parison mold, and further means operative when said parison has been lifted clear of the parison mold for moving it laterally to a position over a blowing mold.

32. In a glass forming machine, parison forming molds and bottle blowing molds, spaced movable supports for said molds, means for moving said supports to bring said molds to and from a common transferring position, transferring mechanism comprising article gripping tongs adapted to move vertically and laterally and to overlie said parison mold in lowered position when said mold reaches the transferring position, fluid pressure operated means operative after the mold has reached the transfer position, for partially elevating said parisons in the parison molds at the transferring position to present the neck ends of the parisons above the molds and in cooperative position within said gripping tongs while maintaining the major portion of said parisons within and centered by said molds, pneumatically operated means operable following the partial lifting of the parisons for actuating said gripping tongs to grip the parison and lift it clear of the parison mold, and further means operative when said parison has been lifted clear of the parison mold for moving it laterally to a position over a blowing mold.

33. In a glass forming machine, parison forming molds and bottle blowing molds, spaced movable supports for said molds, means for intermittently moving said supports to move said molds to and from a common transfer station, transferring mechanism comprising article gripping members adapted to be moved during movement of the supports into position where it will overlie the parison mold at said transfer position, fluid pressure means for partially elevating said parison in the parison molds at the transferring position to present the neck ends of the parisons above the molds and in cooperative position within said gripping tongs while maintaining the major portion of said parisons within and centered by said molds, means operable following the partial lifting of the parisons for actuating said gripping tongs to grip the parison and lift it clear of the parison mold, and further means operative when said parison has been lifted clear of the parison mold for moving it laterally to a position over a blowing mold.

34. In a glass forming machine, parison forming molds and bottle blowing molds, spaced movable supports for said molds, means for intermittently moving said supports to move said molds to and from a common transfer station, transferring mechanism comprising article gripping members adapted to move vertically and laterally and to be moved laterally during movement of the supports into position where it will overlie said parison mold in its lowered position at said transfer station, means for partially elevating said parison in the parison molds at the transferring position to present the neck ends of the parisons above the molds and in cooperative position within said gripping tongs while maintaining the major portion of said parisons within and centered by said molds, means operable following the partial lifting of the parisons for actuating said gripping tongs to grip the parison and lift it clear of the parsion mold, and further means operative when said parison has been lifted clear of the parison mold for moving it laterally to a position over a blowing mold.

35. In a glass forming machine, parison forming molds and bottle blowing molds, spaced movable supports for said molds, means for moving said supports to bring said molds to and from a common transferring position, transferring mechanism comprising article gripping tongs adapted to overlie said parison forming mold as said mold reaches the transferring position, means for partially elevating said parison in the parison molds at the transferring position to present the neck ends of the parisons above the molds and in cooperative position within said gripping tongs while maintaining the major portion of said parisons within and centered by said molds, means operable following and as a result of the operation of said parison elevating means for actuating said gripping tongs to grip the parison and lift it clear of the parison mold, and further means operative when said parison has been lifted clear of the parison mold for moving it laterally to a position over a blowing mold.

36. In a glass forming machine, parison forming molds and bottle blowing molds, spaced movable supports for said molds, means for intermittently moving said supports to move said molds to and from a common transfer station, transferring mechanism comprising article gripping members adapted to be moved during movement of the supports into position where it will overlie the parison mold at said transfer position, means for partially elevating said parisons in the parison molds at the transferring position to present the neck ends of the parisons above the molds and in cooperative position within said gripping tongs while maintaining the major portion of said parisons within and centered by said molds, means operable following and as a result of the operation of said parison elevating means for actuating said gripping tongs to grip the parison and lift it clear of the parison mold, and further means operative when said parison has been lifted clear of the parison mold for moving it laterally to a position over a blowing mold.

37. In a glass working machine comprising movable molds of the sectional type, ware delivery mechanism comprising ware gripping members pivotally mounted upon a vertical support, a ware steadying member on the lower end of said support, fluid pressure operated means for moving said support vertically, first to effect engagement of the ware steadying member in the mouth opening of the ware to steady it during mold opening and then to actuate said gripping means to grip and lift the ware, and means for moving the gripping members and ware steadying member laterally away from the mold.

38. In a mechanism for automatically transferring partly formed glassware from a solid blank to a blow mold having separable mating sections, comprising ware gripping members, means operable to partially elevate the article in the blank mold so that a portion thereof extends above the top of the blank mold and within said gripping members, pneumatically operated means for actuating said gripping members for engaging the exposed portion of the article for lifting and laterally moving it away from the blank mold to an adjacent blow mold, and means for disengaging the gripping members from the article after it is within the blow mold.

39. In a mechanism for automatically transferring partly formed glassware from a solid blank mold to a blow mold having separate mating sections, comprising ware gripping members, pneumatically operated means operable to expose a portion of the article above the top of the blank mold to position within said gripping members, means for actuating said gripping members for engaging the exposed portion of the article for successively lifting and laterally moving it from the blank mold to an open blow mold, and means for disengaging the gripping members from the article after it is within the blow mold.

40. In an automatic glass bottle forming machine in combination with spaced parison forming and bottle blowing molds, of means for forming a parison in said parison forming molds to form the mouth finish of the bottle and initially shape it to a hollow form, means for effecting relative movement between the parison mold and parison, automatic means operable to transfer the parison bodily from the parison mold to the bottle blowing mold while supporting it from the neck finish, fluid pressure operated means operative as a result of the movement of said second named means for actuating said transfer means to effect such movement of the parison, means for blowing the bottle to finished form in the bottle blowing mold, mold clamping means adapted for engagement with said mold for maintaining said bottle blowing mold tightly closed during the finish blowing of said bottle, fluid actuated means for operating said mold clamp, and fluid operated means for opening and closing said molds, all of said means operating automatically and in predetermined timed relation to each other.

41. In an automatic glass bottle forming machine in combination with spaced parison forming and bottle blowing molds, of means for forming a parison in said parison forming molds to form the mouth finish of the bottle and initially shape it to a hollow form, means for effecting relative movement between the parison mold and parison, automatic means to transfer the parison bodily from the parison mold to the bottle blowing mold while supporting it from the neck finish, fluid pressure operated means operating as a result of the movement of said second named means for actuating said transfer means to effect such movement of the parison, means for blowing the bottle to finished form in the bottle blowing mold, mold clamping means adapted for engagement with said mold for maintaining said bottle blowing mold tightly closed during the finish blowing of said bottle, fluid actuated means for operating said mold clamp, and fluid operated means for opening and closing said molds, and take out mechanism adapted to grip the mouth end of the finished ware for gripping said ware, and move it laterally to a point remote from said bottle blowing mold, all of said means operating automatically and in predetermined timed relation to each other.

42. In an automatic bottle forming machine, in combination with spaced parison forming and bottle blowing molds, parison forming mechanism for initially shaping the glass charge into a hollow parison and to form the mouth finish while in the parison mold, fluid pressure means for actuating said parison forming mechanism, means automatically operative following and in predetermined timed relation to the actuating of the forming mechanism for freeing the parison from the parison forming mold, mouth finish engaging means for gripping the mouth end of the parison and for supporting it after disengagement from the parison mold, a support for said mouth finish engaging means, fluid pressure operated means operative as a result of the operation of the second named means for actuating said support for effecting movement of said mouth finish engaging means and the parison supported thereby bodily to transfer the parison from the parison mold to the bottle blowing mold, and in predetermined timed relation to the freeing of the parison from the parison mold, means operative upon the conclusion of the movement of said support, for effecting disengagement of the mouth finish engaging means with said parison whereby the parison is supported entirely by the bottle blowing mold and to effect immediate return of the support and the mouth finish engaging means to its normal position with reference to a parison mold, blow head means for blowing the bottle to finished form in the bottle blowing mold, fluid pressure operated means for actuating said blow head in predetermined timed relation to the movement of said parison forming mechanism and the movements of the support for effecting transfer, means for opening the bottle blowing molds following and in proper predetermined timed relation to the finish blow, and take out means adapted to grip the mouth finish of the bottle to lift it and move it laterally and deposit it at a point remote from said blow mold.

43. Transfer mechanism for use in automatic glass bottle forming machines, adapted to transfer the glass parisons from a non-invertible blank mold to a laterally spaced blow mold, comprising means for effecting relative movement between the blank mold and the parison, means in axial alignment with the blank mold during the operation of said disengaging means for embracing the neck finish of the parison and supporting it during transfer, means automatically controlled following the operation of the first named means for moving the parison thus supported laterally and for positioning it in a stationary blow mold preparatory to the final blowing of the bottle to finished form therein, means for disengaging the neck finish embracing means before the final blowing operation, and connections for automatically operating said means in predetermined timed relation to each other and in synchronism with the forming operations of said machine.

44. Transfer mechanism for use in automatic glass bottle forming machines, adapted to transfer glass parisons from a non-invertible blank mold to a laterally spaced blow mold, comprising means for effecting relative movement between the blank mold and the parison, means in axial alignment with the blank mold during the operation of said disengaging means for embracing the neck finish of the parison and supporting it during transfer, automatic means for moving the parison thus supported laterally and for positioning it in a stationary blow mold preparatory to the final blowing of the bottle to finished form therein, cam means rendered operative upon the positioning of the parison in the blow mold for disengaging the neck finish embracing means before the final blowing operation, and connections for automatically operating said means in predetermined timed relation to each other and in synchronism with the forming operations of said machine.

45. Transfer mechanism for use in automatic glass bottle forming machines, adapted to transfer glass parisons from a blank mold to a laterally spaced blow mold, comprising means for effecting relative movement between the blank mold and the parison to expose the parison, means positioned axially of the parison as it is exposed for supporting it during transfer, a stationary support for said last named means, fluid pressure operated means for laterally moving the parison thus supported and for positioning it in the blow mold preparatory to the final blowing of the bottle to finished form therein, means for disengaging the parison supporting means before the final blowing operation, and connections for automatically operating said means in predetermined timed relation to each other and in synchronism with the forming operations of said machine.

46. Transfer mechanism for use in automatic glass bottle forming machines, adapted to transfer glass parisons from a non-invertible blank mold to a laterally spaced blow mold, comprising means for effecting relative movement between the blank mold and the parison to expose the parison, means positioned axially of the parison as it is exposed for supporting it during transfer, fluid pressure operated means for laterally moving the parison thus supported and for positioning it in the blow mold preparatory to the final blowing of the bottle to finished form therein, means for disengaging the parison supporting means before the final blowing operation, means for returning the neck finish engaging and supporting means to its operative position to the blank mold, and connections for automatically operating said means in predetermined timed relation to each other and in synchronism with the forming operations of said machine.

47. Transfer mechanism for use in automatic glass bottle forming machines, adapted to transfer glass parisons from a non-invertible blank mold to a laterally spaced blow mold, comprising fluid pressure operated means for effecting relative movement between the blank mold and the parison to expose the parison, means in operative alignment therewith for embracing the neck finish of the parison and supporting it during transfer, fluid pressure operated means for moving the parison thus supported laterally and for positioning it in the blow mold preparatory to the final blowing of the bottle to finished form therein, means for disengaging the neck finish embracing means before the final blowing operation, and returning it into operative alignment with a blank mold, and connections for automatically operating said means in predetermined timed relation to each other and in synchronism with the forming operations of said machine.

48. In a glass bottle forming machine, laterally spaced parison and blow mold carriers, and series of parison molds and blow molds carried by the respective carriers in substantially the same horizontal plane, means for moving said carriers in unison to bring successive pairs of cooperating parison and blow molds towards each other in the same direction for transfer of the parisons, automatic transfer means comprising means for effecting relative movement between the parisons and parison molds to expose the parisons in succession, means above the parison molds and in axial alignment therewith as each successive parison is exposed for engaging the neck thereof and supporting it during transfer, means to move the thus supported parison laterally to position it within a cooperating blow mold, and then disengaging the supporting means therefrom, and means operating after the disengagement of the supporting means from the parisons and in timed relation thereto for blowing the bottles to finished form in the blow molds.

49. In a glass bottle forming machine, laterally spaced parison and blow mold carriers, and series of non-invertible parison molds and blow molds carried by the respective carriers in substantially the same horizontal plane, means for moving said carriers in unison to bring successive pairs of cooperating parison and blow molds towards each other for transfer of the parisons, automatic transfer means comprising means for effecting relative movement between the parisons and parison molds to expose the parisons in succession, means above the parison molds and in axial alignment therewith as each successive parison is exposed for engaging the neck thereof and supporting it during transfer, means to move the thus supported parison laterally to position it within a cooperating blow mold, and then disengaging the supporting means therefrom, and means operating after the disengagement of the supporting means from the parisons and in timed relation thereto for blowing the bottles to finished form in the blow molds.

50. In a glass bottle forming machine, laterally spaced parison and blow mold carriers, and series of parison molds and blow molds carried by the respective carriers in substantially the same horizontal plane, means for intermittently moving said carriers in unison to bring successive pairs of cooperating parison and blow molds towards each other for transfer of the parisons, automatic transfer means comprising means for effecting relative movement between the parisons and parison molds to expose the parisons in succession, means above the parison molds and in axial alignment therewith as each successive parison is exposed for engaging the neck thereof and supporting it during transfer, means to move the thus supported parison laterally to position it within a cooperating blow mold, and then while the blow mold is stationary disengaging the supporting means therefrom, and means operating after the disengagement of the supporting means from the parisons and in timed relation thereto for blowing the bottles to finished form in the blow molds.

51. In a glass bottle forming machine, laterally spaced parison and blow mold carriers, and series of parison molds and blow molds carried by the respective carriers in substantially the same horizontal plane, means for moving said carriers in unison to bring successive pairs of cooperating parison and blow molds towards each other for transfer of the parisons, automatic transfer means comprising means for effecting relative movement between the parisons and parison molds to expose the parisons in succession, horizontally movable means normally above the parison molds and in axial alignment therewith as each successive parison is exposed for engaging the neck thereof and supporting it during transfer, means to move the thus supported parison laterally to position it within a cooperating blow mold, and then disengaging the supporting means therefrom, and means operating after the disengagement of the supporting means from the parisons and in timed relation thereto for blowing the bottles to finished form in the blow molds.

52. In a glass bottle forming machine, laterally spaced parison and blow mold carriers, and series of parison and blow molds carried by the respective carriers in substantially the same horizontal plane, means for moving said carriers in unison to bring successive pairs of cooperating parison and blow molds opposite each other in radial alignment for transfer of the parison, automatic transfer means comprising means for effecting relative movement between the parisons and parison molds to expose the parisons in succession, means above the parison molds and in axial alignment therewith as each successive parison is exposed for engaging the neck thereof and supporting it during transfer, means to move the thus supported parison laterally to position it within a cooperating blow mold, and then disengaging the supporting means therefrom, and means operating after the disengagement of the supporting means from the parisons and in timed relation thereto for blowing the bottles to finished form in the blow molds.

53. In a glass bottle forming machine, laterally spaced parison and blow mold carriers, and series of parison and blow molds carried by the respective carriers in substantially the same horizontal plane, means for moving said carriers in unison to bring successive pairs of cooperating parison and blow molds opposite each other in radial alignment for transfer of the parison, automatic transfer means comprising means for effecting relative movement between the parisons and parison molds to expose the parisons in succession, non-invertible means above the parison molds and in axial alignment therewith as each successive parison is exposed for engaging the neck thereof and supporting it during transfer, means to move the thus supported parison laterally to position it within a cooperating blow mold, and then disengaging the supporting means therefrom, and means operating after the disengagement of the supporting means from the parisons and in timed relation thereto for blowing the bottles to finished form in the blow molds.

54. In a glass bottle forming machine, laterally spaced parison and blow mold carriers, and series of parison and blow molds carried by the respective carriers in substantially the same horizontal plane, means for intermittently moving said carriers in unison to bring successive pairs of cooperating parison and blow molds opposite each other in radial alignment for transfer of the parison, automatic transfer means comprising means for effecting relative movement between the parisons and parison molds to expose the parisons in succession, non-invertible means above the parison molds and in axial alignment therewith as each successive parison is exposed for engaging the neck finish thereof and supporting it during transfer, means to move the thus supported parison laterally to position it within a cooperating blow mold, and then disengaging the supporting means therefrom, and means operating after the disengagement of the supporting means from the parisons and in timed relation thereto for blowing the bottles to finished form in the blow molds.

55. In a glass bottle forming machine, laterally spaced parison and blow mold carriers, and series of parison and blow molds carried by the respective carriers in substantially the same horizontal plane, means for moving said carriers in unison to bring successive pairs of cooperating parison and blow molds towards each other for transfer of the parisons, automatic transfer means comprising means for effecting relative movement between the parisons and parison molds to expose the parisons in succession, means above the parison molds and in axial alignment therewith as each successive parison is exposed for engaging the neck thereof and supporting it during transfer, means to move the thus supported parison radially to position it within a cooperating blow mold, and then disengaging the supporting means therefrom, and means operating after the disengagement of the supporting means from the parisons and in timed relation thereto for blowing the bottles to finished form in the blow molds.

56. In a glass bottle forming machine, laterally spaced parison and blow mold carriers, and series of parison and blow molds carried by the respective carriers in substantially the same horizontal plane, means for moving said carriers in unison to bring successive pairs of cooperating parison and blow molds towards each other for transfer of the parisons, automatic transfer means comprising means for effecting relative movement between the parisons and parison molds to expose the parisons in succession, non-invertible means above the parison molds and in axial alignment therewith as each successive parison is exposed for engaging the neck thereof and supporting it during transfer, means to move the thus supported parison radially to position it within a cooperating blow mold, and then disengaging the supporting means therefrom, and means operating after the disengagement of the supporting means from the parisons and in timed relation thereto for blowing the bottles to finished form in the blow molds.

57. In a glass bottle forming machine, laterally spaced parison and blow mold carriers, and series of parison and blow molds carried by the respective carriers in substantially the same horizontal plane, means for intermittently moving said carriers in unison to bring successive pairs of cooperating parison and blow molds towards each other for transfer of the parisons, automatic transfer means comprising means for effecting relative movement between the parisons and parison molds to expose the parisons in succession, non-invertible means above the parison molds and in axial alignment therewith as each successive parison is exposed for engaging the neck thereof and supporting it during transfer, means to move the thus supported parison radially to position it within a cooperating blow mold, and then disengaging the supporting means therefrom, and means operating after the disengagement of the supporting means from the parisons and in timed relation thereto for blowing the bottles to finished form in the blow molds.

58. In a glass bottle forming machine, laterally spaced parison and blow mold carriers, and series of parison and blow molds carried by the respective carriers in substantially the same horizontal plane, means for moving said carriers in unison to bring successive pairs of cooperating parison and blow molds towards each other for transfer of the parisons, automatic transfer means comprising means for effecting relative movement between the parisons and parison molds to expose the parisons in succession, means above the parison molds and in axial alignment therewith as each successive parison is exposed for engaging the neck thereof and supporting it during transfer, means operative following the operation of said second named means to move the thus supported parison laterally to position it within a cooperating blow mold, and then disengaging the supporting means therefrom, and means operating after the disengagement of the supporting means from the parisons and in timed relation thereto for blowing the bottles to finished form in the blow molds.

59. In a glass bottle forming machine, laterally spaced parison and blow mold carriers, and series of parison and blow molds carried by the respective carriers in substantially the same horizontal plane, means for moving said carriers in unison to bring successive pairs of cooperating parison and blow molds towards each other for transfer of the parisons, automatic transfer means comprising means for effecting relative movement between the parisons and parison molds to expose the parisons in succession, non-invertible means above the parison molds and in axial alignment therewith as each successive parison is exposed for engaging the neck thereof and supporting it during transfer, means operative following the operation of said second named means to move the thus supported parison laterally to position it within a cooperating blow mold, and then disengaging the supporting means therefrom, and means operating after the disengagement of the supporting means from the parisons and in timed relation thereto for blowing the bottles to finished form in the blow molds.

60. In a glass bottle forming machine, laterally spaced parison and blow mold carriers, and series of parison and blow molds carried by the respective carriers in substantially the same horizontal plane, means for moving said carriers in unison to bring successive pairs of cooperating parison and blow molds towards each other for transfer of the parison, automatic transfer means comprising means for effecting relative movement between the parisons and parison molds, means above the parison molds and in axial alignment therewith as each successive parison is exposed for engaging the neck thereof and supporting it during transfer, means to move the thus supported parison laterally to position it within a cooperating blow mold, cam means rendered operative upon the positioning of the parison in the blow mold for disengaging the supporting means therefrom, and means operating after the disengagement of the supporting means from the parisons and in timed relation thereto for blowing the bottles to finished form in the blow molds.

61. In a glass bottle forming machine, laterally spaced parison and blow mold carriers, and series of parison and blow molds carried by the respective carriers in substantially the same horizontal plane, means for intermittently moving said carriers in unison to bring successive pairs of cooperating parison and blow molds towards each other for transfer of the parison, automatic transfer means comprising means for effecting relative movement between the parisons and parison molds, non-invertible means above the parison molds and in axial alignment therewith as each successive parison is exposed for engaging the neck thereof and supporting it during transfer, means to move the thus supported parison laterally to position it within a cooperating blow mold, cam means rendered operative upon the positioning of the parison in the blow mold for disengaging the supporting means therefrom while the blow mold is stationary, and means operating after the disengagement of the supporting means from the parisons and in timed relation thereto for blowing the bottles to finished form in the blow molds.

62. In a glassware machine, a movable blank mold carrier having radially disposed, non-invertible blank molds thereon and movable in a cyclical path, a movable blow mold carrier having radially disposed blow molds thereon movable in a different non-axial, cyclical path, means for intermittently moving said carriers in unison to present said molds opposite each other in substantially the same horizontal plane for transfer of the parisons, automatically operated mechanisms for transferring the glass parisons from the blank molds to the blow molds comprising means for disengaging the blank molds from the parisons in succession to expose the parisons, means positioned axially of the blank molds, as each successive parison is exposed, for supporting the parison from the mouth finish thereof, means for successively shifting the parisons and their supporting means radially away from the blank molds into position within the blow molds, and means for automatically releasing the supporting transfer means, all operating in predetermined sequence whereby the blanks supported wholly by the blow mold may be moved to a position to be blown to final form therein.

63. Transfer mechanism for use in automatic glass bottle forming machines, adapted to transfer the glass parisons from a blank mold to a laterally spaced blow mold, comprising means for effecting relative movement between the blank mold and the parison to expose the parison, means in axial alignment therewith as said parison is exposed for engaging the neck finish of the parison and supporting it during transfer, means for moving the parison thus supported laterally and positioning it in the blow mold preparatory to the final blowing of the bottle to finished form therein, means for disengaging the neck finish engaging means before the final blowing operation, and connections for automatically operating said means in predetermined timed relation to each other and in synchronism with the forming operations of said machine.

64. Transfer mechanism for use in automatic glass bottle forming machines, adapted to transfer glass parisons from a blank mold to a laterally spaced blow mold, comprising means for effecting relative movement between the blank mold and the parison to expose the parison, means in axial alignment with the blank mold during the operation of said disengaging means for engaging the neck finish of the parison and supporting it during transfer, automatic means for moving the parison thus supported laterally for positioning it in the blow mold preparatory to the final blowing of the bottle to finished form therein, cam means rendered operative upon the positioning of the parison in the blow mold for disengaging the neck finish engaging means before the final blowing operation, and connections for automatically operating said means in predetermined timed relation to each other and in synchronism with the forming operations of said machine.

65. Transfer mechanism for use in automatic glass bottle forming machines, adapted to transfer the glass parisons from a non-invertible blank mold to a laterally spaced blow mold, comprising means for effecting relative movement between the blank mold and the parison to expose the parison, means in axial alignment therewith as said parison is exposed for engaging the neck finish of the parison and supporting it during transfer, means for moving the parison thus supported laterally and positioning it in the blow mold preparatory to the final blowing of the bottle to finished form therein, means for disengaging the neck finish engaging means before the final blowing operation, and connections for automatically operating said means in predetermined timed relation to each other and in synchronism with the forming operations of said machine.

66. Transfer mechanism for use in automatic glass bottle forming machines, adapted to transfer glass parisons from a non-invertible blank mold to a laterally spaced blow mold, comprising means for effecting relative movement between the blank mold and the parison to expose the parison, means in axial alignment with the blank mold during the operation of said disengaging means for engaging the neck finish of the parison and supporting it during transfer, automatic means for moving the parison thus supported laterally for positioning it in the blow mold preparatory to the final blowing of the bottle to finished form therein, cam means rendered operative upon the positioning of the parison in the blow mold for disengaging the neck finish engaging means before the final blowing operation, and connections for automatically operating said means in predetermined timed relation to each other and in synchronism with the forming operations of said machines.

67. The combination with a glassware forming machine having a movable mold support and a plurality of sectional molds mounted thereon and adapted to be brought in succession into the take-out position by the movement of said support, of means for holding the ware upright in the molds as the latter are opened at the take-out position, take-out means for removing the ware from opened molds, comprising a guide above the molds at the take-out position and extending radially therebeyond, a mounting for said take-out means movable on said guide and means coordinated with the movements of the glassware forming machine for operating said mounting for effecting lateral movement of the take-out means away from the mold.

68. The combination with a glassware forming machine having a movable mold support and a plurality of sectional molds mounted thereon which are adapted to be brought in succession into the take-out position by the movement of said support, of take-out means for removing the ware from the opened molds, and means cooperating in unison with the take-out means and actuated by the movement of the latter, to hold the ware upright as the molds are opened.

69. The combination with a glassware forming machine having a movable mold support and a plurality of sectional molds mounted thereon to be moved in succession to the take-out position by the movement of said support, and take-out means arranged to grasp the ware and remove it from the opened mold, of means to hold the ware upright during mold opening movement to properly present the ware to the take-out means, comprising a ware engaging member adapted to be inserted into the neck of the ware and means movable as a result of the movement of the take-out means into cooperating relation with the ware for depressing said engaging member into engagement with the ware.

70. The combination with a glassware forming machine having a movable mold support and a plurality of sectional molds mounted thereon to be moved in succession to the take-out position by the movement of said support, and take-out means arranged to grasp the ware and remove it from the opened mold, of means to hold the ware upright during opening movements of the mold to properly present the ware to the take-out means comprising a plug adapted to be positioned within the mouth of the ware and means mounting said plug for movement in unison with said take-out means whereby the positioning of the plug within the mouth of the ware is controlled by movement of the take-out means into cooperative position with relation to the ware.

71. The combination with a machine for forming hollow glass containers having a mold support, a separable sectional mold mounted thereon, and mechanism for the removal of the ware from the opened mold, of means for holding the ware upright as the mold opens comprising a ware steadier associated with said mechanism for movement therewith, and means for depressing said ware steadier into the mouth of the ware as a result of the movement of the mechanism.

72. The combination with a machine for forming hollow glass containers having a mold support, a separable sectional mold mounted thereon and take-out mechanism for the removal of the ware from the opened mold, of means for holding the ware upright as the mold opens comprising a ware steadying member arranged to be moved into engagement with the ware, and means controlled by movement of the take-out mechanism for moving said ware steadying member into engagement with the ware.

73. The combination in a machine for forming hollow glass containers having a mold support, of a separable sectional mold mounted thereon and laterally movable take-out mechanism for the removal of the ware from the opened mold, of means for holding the ware upright as the mold opens, comprising a ware engaging member for engaging the ware and steadying it during mold opening, and means controlled by movement of the take-out mechanism, for moving the ware engaging member into engagement with the ware as the take-out mechanism approaches its take-out position, but prior to gripping of the ware by the take-out mechanism.

74. Article moving mechanism for use in automatic glass bottle forming machines for moving glass articles from a sectional open mold to a position laterally removed therefrom, comprising means for automatically opening said sectional molds, of means engaging the mouth end of the article prior to and during mold opening movements, and additional means for moving the article engaging means and article laterally away from the mold, and cam means rendered operative upon conclusion of the lateral movement of the engaging means and article for disengaging the engaging means from the article.

75. In a glass machine, a mold table, sectional molds on said table adapted to hold the glass articles, means for opening said molds, means operable before the molds are opened to enter the interior of the articles to prevent their sticking to either section of the molds when the molds are opened, and further means in axial alignment with the molds as they are opened effective after the articles are held centered for gripping and removing the articles from the molds.

76. In a glass machine, a mold table, sectional molds on said table adapted to hold the glass articles, means for opening said molds, means operable before the molds are opened to engage the ware to prevent it sticking to either section of the molds when the molds are opened, and further means overlying the molds as they are opened effective after opening thereof to grip and remove the articles from the mold.

77. In a glass machine, the combination with a mold table, sectional molds thereon, and means for opening said molds, of means operable before the molds are opened to engage the ware to prevent it sticking to either section of the molds when they are opened, and further means axially disposed with reference to the ware and effective after the ware is engaged and after the molds are opened to first elevate the ware and then move it laterally out of the molds.

78. In a glass machine, a movable mold table, sectional molds thereon, means for opening said molds, and a single unit common to all molds embodying means to engage the ware before the molds are opened to hold it centered and means for gripping and removing the ware after the molds are opened.

79. Glass blowing apparatus comprising a pair of mold sections movable to open position, bottle-top-engaging means for retaining bottle ware from shifting as the mold sections open therefrom and bottle neck gripping members overlying the molds as they are opened and coacting with the ware for removing the ware from the open mold.

In testimony whereof I affix my signature.

CHARLES BADGER.

CERTIFICATE OF CORRECTION.

Patent No. 1,792,267.                        Granted February 10, 1931, to

CHARLES BADGER.

It is hereby certified that the above numbered patent was erroneously issued to "Lynch Glass Machine Company", whereas said patent should have been issued to Lynch Corporation, of Anderson, Indiana, a corporation of Indiana, as assignee by mesne assignments of the entire interest in said invention:

Page 8, line 55, for "body" read port, and line 97, for the misspelled word "wihin" read within; page 12, line 85, claim 16, for "clank" read blank; page 13, line 89, claim 25, after the word "fluid" insert the word pressure; and that the said Letters Patent should be read with these corrections therein that the same may conform to the record of the case in the Patent Office.

Signed and sealed this 17th day of March, A. D. 1931

(Seal)                                                     M. J. Moore,
                                                            Acting Commissioner of Patents.